(12) United States Patent
Sugitani et al.

(10) Patent No.: US 12,520,040 B2
(45) Date of Patent: Jan. 6, 2026

(54) FOCUS PREDICTION APPARATUS, IMAGE CAPTURING APPARATUS, FOCUS PREDICTION METHOD, AND STORAGE MEDIUM

(71) Applicant: CANON KABUSHIKI KAISHA, Tokyo (JP)

(72) Inventors: Kuniaki Sugitani, Kanagawa (JP); Akihiko Kanda, Kanagawa (JP); Yohei Matsui, Kanagawa (JP); Hiroshi Yashima, Kanagawa (JP); Hideki Ogura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 18/411,537

(22) Filed: Jan. 12, 2024

(65) Prior Publication Data

US 2024/0244321 A1 Jul. 18, 2024

(30) Foreign Application Priority Data

Jan. 16, 2023 (JP) .................................. 2023-004702

(51) Int. Cl.
*H04N 23/67* (2023.01)
*H04N 23/611* (2023.01)
*H04N 23/667* (2023.01)

(52) U.S. Cl.
CPC ......... *H04N 23/672* (2023.01); *H04N 23/611* (2023.01); *H04N 23/667* (2023.01)

(58) Field of Classification Search
CPC .................................................. H04N 23/672
See application file for complete search history.

(56) References Cited

U.S. PATENT DOCUMENTS

2011/0262123 A1* 10/2011 Ichimiya ............... H04N 23/635
396/104
2023/0247288 A1* 8/2023 Sakurabu ............... G03B 13/36
(Continued)

FOREIGN PATENT DOCUMENTS

JP 2018-064285 A 4/2018

OTHER PUBLICATIONS

Redmon, Joseph, et al., "You Only Look Once: Unified, Real-Time Object Detection.", 10 pgs, Proceedings of the IEEE conference on computer vision and pattern recognition, 2016, Cited in Specification in paragraph [0083].

(Continued)

*Primary Examiner* — Cynthia Segura
(74) *Attorney, Agent, or Firm* — Cowan, Liebowitz & Latman, P.C.

(57) ABSTRACT

There is provided a focus prediction apparatus. A detection unit detects two or more subjects in each of a plurality of images that are sequentially generated through continuous shooting. A selection unit selects a main subject from among the two or more subjects with respect to each of the images. With respect to each of the images, a storage unit stores a focus position at which a target subject is brought into focus, for each of the two or more subjects as the target subject. A prediction unit performs first prediction processing in response to generation of a first image through the continuous shooting, the first prediction processing being for predicting a future focus position of a main subject in the first image based on a history of focus positions corresponding to the main subject in the first image.

10 Claims, 18 Drawing Sheets

(56) References Cited

U.S. PATENT DOCUMENTS

2023/0341079 A1* 10/2023 Wang .................. H04N 23/695
2024/0098366 A1*  3/2024 Matsui ..................... G06T 7/20
2024/0397196 A1* 11/2024 Wang .................. H04N 23/632

OTHER PUBLICATIONS

Cao, Zhe, et al., "Realtime Multi-Person 2d Pose Estimation using Part Affinity Fields.", 9 pgs, Proceedings of the IEEE Conference on Computer Vision and Pattern Recognition, 2017, Cited in Specification in paragraph [0048].

* cited by examiner

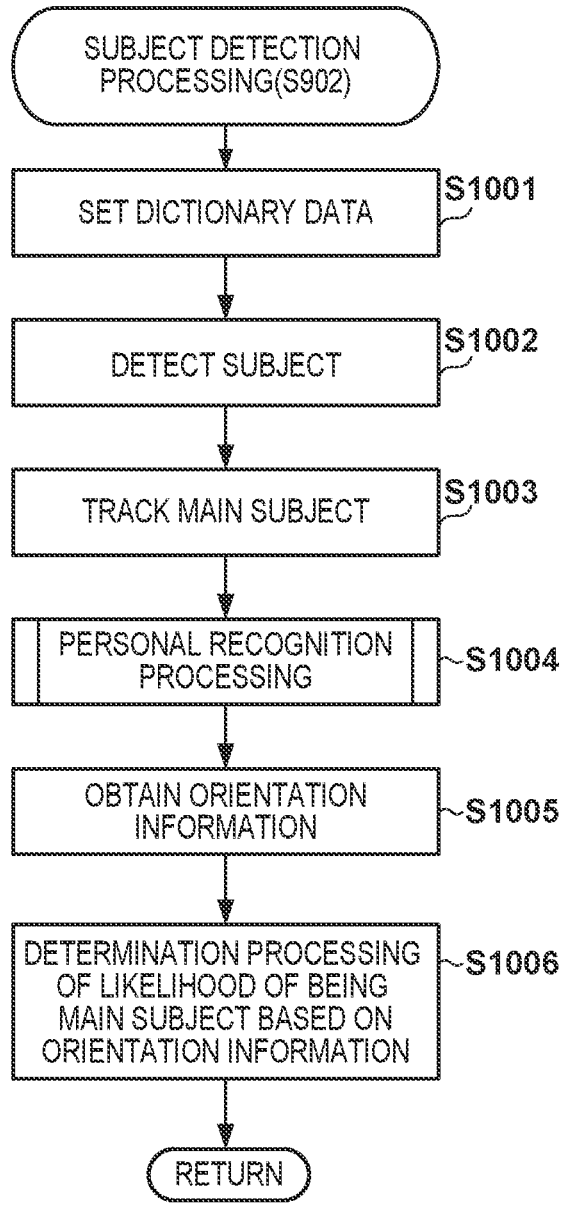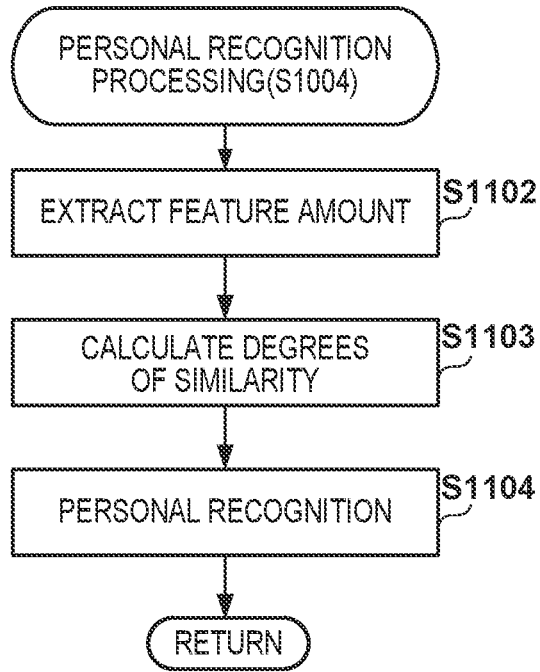

FOCUS PREDICTION APPARATUS, IMAGE CAPTURING APPARATUS, FOCUS PREDICTION METHOD, AND STORAGE MEDIUM

BACKGROUND OF THE INVENTION

Field of the Invention

The present invention relates to a focus prediction apparatus, an image capturing apparatus, a focus prediction method, and a storage medium.

Description of the Related Art

Conventionally, in order to maintain focus while switching between a plurality of subjects, a photographer needs to match an autofocus (AF) target area, which is set on an image capturing apparatus, with desired subjects while performing shooting, thus requiring the photographer to be skilled.

In light of this, Japanese Patent Laid-Open No. 2018-064285 discloses a technique for making a prediction with regard to a plurality of subjects and accordingly adjusting the depth of field.

However, with the conventional technique disclosed in Japanese Patent Laid-Open No. 2018-064285, the depth of field is adjusted in order to bring a plurality of subjects in focus, and therefore a focus-target subject is not necessarily switched.

SUMMARY OF THE INVENTION

The present invention has been made in view of the foregoing situation, and provides a technique to improve the accuracy of focus position control performed based on a main subject in a situation where the main subject has been selected from among two or more subjects included in a captured image.

According to a first aspect of the present invention, there is provided a focus prediction apparatus comprising at least one processor and/or at least one circuit which functions as: a detection unit configured to detect two or more subjects in each of a plurality of images that are sequentially generated through continuous shooting: a selection unit configure to select a main subject from among the two or more subjects with respect to each of the images: a storage unit configured to, with respect to each of the images, store a focus position at which a target subject is brought into focus, for each of the two or more subjects as the target subject: and a prediction unit configured to perform first prediction processing in response to generation of a first image through the continuous shooting, the first prediction processing being for predicting a future focus position of a main subject in the first image based on a history of focus positions corresponding to the main subject in the first image.

According to a second aspect of the present invention, there is provided an image capturing apparatus, comprising: the focus prediction apparatus according to the first aspect, wherein the at least one processor and/or the at least one circuit further functions as a shooting unit configured to sequentially generate the images by performing the continuous shooting.

According to a third aspect of the present invention, there is provided a focus prediction method executed by a focus prediction apparatus, comprising: detecting two or more subjects in each of a plurality of images that are sequentially generated through continuous shooting: selecting a main subject from among the two or more subjects with respect to each of the images: with respect to each of the images, storing a focus position at which a target subject is brought into focus, for each of the two or more subjects as the target subject: and performing first prediction processing in response to generation of a first image through the continuous shooting, the first prediction processing being for predicting a future focus position of a main subject in the first image based on a history of focus positions corresponding to the main subject in the first image.

According to a fourth aspect of the present invention, there is provided a non-transitory computer-readable storage medium which stores a program for causing a computer to execute a focus prediction method comprising: detecting two or more subjects in each of a plurality of images that are sequentially generated through continuous shooting: selecting a main subject from among the two or more subjects with respect to each of the images: with respect to each of the images, storing a focus position at which a target subject is brought into focus, for each of the two or more subjects as the target subject: and performing first prediction processing in response to generation of a first image through the continuous shooting, the first prediction processing being for predicting a future focus position of a main subject in the first image based on a history of focus positions corresponding to the main subject in the first image.

Further features of the present invention will become apparent from the following description of exemplary embodiments with reference to the attached drawings.

BRIEF DESCRIPTION OF THE DRAWINGS

FIG. 10 is a flowchart showing the details of subject detection processing (step S902).

FIG. 11 is a flowchart showing the details of personal recognition processing (step S1004).

DESCRIPTION OF THE EMBODIMENTS

Figure 1:
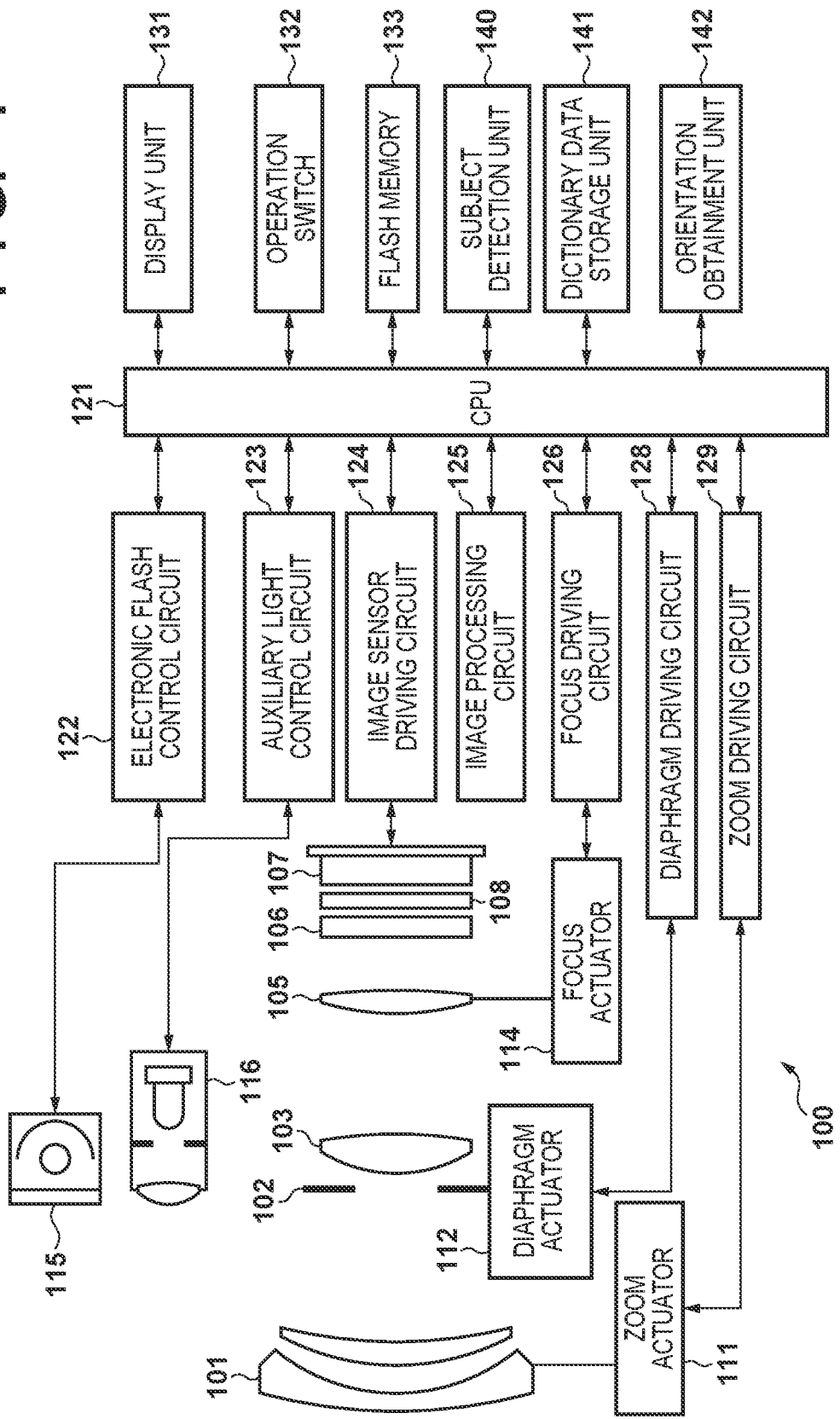
FIG. 1 is a block diagram showing a configuration of a camera 100 as an image capturing apparatus that includes a focus prediction apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration of Camera 100

FIG. 1 is a block diagram showing a configuration of a camera 100 as an image capturing apparatus that includes a focus prediction apparatus. In FIG. 1, a first lens assembly 101 is arranged closest to the subject side (front side) in an image capturing optical system, and is held to be movable in the optical axis direction. A diaphragm 102 adjusts the amount of light by adjusting the aperture diameter thereof. A second lens assembly 103 moves in the optical axis direction in unison with the diaphragm 102, and performs variable magnification (zooming) together with the first lens assembly 101 that moves in the optical axis direction.

A third lens assembly 105 (a focus lens) makes focus adjustments by moving in the optical axis direction. An optical low-pass filter 106 is an optical element for alleviating false color and moiré of a captured image. The image capturing optical system is composed of the first lens assembly 101, the diaphragm 102, the second lens assembly 103, the third lens assembly 105, and the optical low-pass filter 106.

A zoom actuator 111 causes a non-illustrated cam cylinder to rotate around the optical axis, thereby causing the first lens assembly 101 and the second lens assembly 103 to move in the optical axis direction via a cam mounted on the cam cylinder and perform variable magnification. A diaphragm actuator 112 drives a non-illustrated plurality of light-shielding blades in the open/close direction for a light amount adjustment operation of the diaphragm 102. A focus actuator 114 causes the third lens assembly 105 to move in the optical axis direction and make focus adjustments.

A focus driving circuit 126 causes the third lens assembly 105 to move in the optical axis direction by driving the focus actuator 114 in accordance with a focus driving command from a CPU 121. A diaphragm driving circuit 128 drives the diaphragm actuator 112 in accordance with a diaphragm driving command from the CPU 121. A zoom driving circuit 129 drives the zoom actuator 111 in accordance with a zoom operation by a user.

Note that the present embodiment is described in relation to a case where the image capturing optical system, the three actuators (reference signs 111, 112, and 114), and the three driving circuits (reference signs 126, 128, and 129) are provided integrally with a body of the camera 100 including an image sensor 107. However, an interchangeable lens that includes the image capturing optical system, the three actuators (reference signs 111, 112, and 114), and the three driving circuits (reference signs 126, 128, and 129) may be attachable to and removable from the body of the camera 100.

An electronic flash 115 includes a light emitting element such as a xenon tube and an LED, and emits light that irradiates a subject. An AF auxiliary light emission unit 116 includes a light emitting element such as an LED, and projects a mask image having a predetermined aperture pattern onto a subject via a light projection lens, thereby improving the focus detection performance for a dark or low-contrast subject. An electronic flash control circuit 122 performs control to light the electronic flash 115 in synchronization with an image capturing operation. An auxiliary light control circuit 123 performs control to light the AF auxiliary light emission unit 116 in synchronization with a focus detection operation.

The CPU 121 takes charge of various types of control in the camera 100. The CPU 121 includes a computation unit, a ROM, a RAM, an A/D converter, a D/A converter, a communication interface circuit, and so forth. In accordance with a computer program stored in the ROM, the CPU 121 drives various types of circuits inside the camera 100, and controls a sequence of operations such as AF, image capturing, image processing, and recording. Therefore, the CPU 121 has functions for defocus amount detection, focus position detection, determination of a main subject, storing, and prediction. Furthermore, the CPU 121 functions as an image processing apparatus.

The image sensor 107 is composed of a two-dimensional CMOS photosensor, which includes a plurality of pixels, and peripheral circuits thereof, and is arranged on an image forming plane of the image capturing optical system. The image sensor 107 photoelectrically converts a subject image formed by the image capturing optical system. An image sensor driving circuit 124 controls the operations of the image sensor 107, and also performs A/D conversion of analog signals generated through the photoelectric conversion and transmits digital signals to the CPU 121.

A shutter 108 has a configuration of a focal-plane shutter, and drives the focal-plane shutter in accordance with a command from a shutter driving circuit built in the shutter 108 based on an instruction from the CPU 121. During readout of signals of the image sensor 107, the shutter 108 shields the image sensor 107 from light. Also, during exposure, the focal-plane shutter is opened, and shooting light beams are directed to the image sensor 107.

An image processing circuit 125 applies preset image processing to image data accumulated in the RAM inside the CPU 121. The image processing applied by the image processing circuit 125 includes, but is not limited to, so-called development processing such as white balance adjustment processing, color interpolation (demosaicing) processing, and gamma correction processing, as well as signal format conversion processing, scaling processing, and the like. Furthermore, the image processing circuit 125 stores processed image data, the positions of joints of each subject, information of the positions and sizes of specific objects, the centers of mass of subjects, position information of faces and pupils, and the like into the RAM inside the CPU 121.

A display unit 131 includes a display element such as an LCD, and displays information related to an image capturing mode of the camera 100, a preview image before image capturing, an image for confirmation after image capturing, indices for focus detection regions, an in-focus image, and so forth. An operation switch 132 includes a main (power) switch, a release (shooting trigger) switch, a zoom operation switch, a shooting mode selection switch, and so forth, and is operated by the user. Captured images are recorded into a flash memory 133. The flash memory 133 is attachable to and removable from the camera 100.

A subject detection unit 140 performs subject detection based on dictionary data (hereinafter referred to as "detection-purpose dictionary data") generated through machine learning. In the present embodiment, in order to detect a plurality of types of subjects, the subject detection unit 140 uses pieces of detection-purpose dictionary data of the respective subjects. Each piece of detection-purpose dictionary data is, for example, data in which the features of a corresponding subject are registered. The subject detection unit 140 performs subject detection while sequentially switching among the pieces of detection-purpose dictionary data of the respective subjects. In the present embodiment, the pieces of detection-purpose dictionary data of the respective subjects are stored in a dictionary data storage unit 141. Therefore, a plurality of pieces of detection-purpose dictionary data are stored in the dictionary data storage unit 141. Based on the preset priority degrees of subjects and the settings of the camera 100, the CPU 121 determines which piece of detection-purpose dictionary data is to be used, among the plurality of pieces of detection-purpose dictionary data, in performing subject detection. The subject detection unit 140 performs detection of a person, as well as detection of the person's organs such as a face, pupils, and a torso, as subject detection. The subject detection unit 140 may additionally detect a subject other than a person, such as a ball (object detection), for example.

The subject detection unit 140 may specify an individual with respect to a person who has been detected using the detection-purpose dictionary data (personal recognition). The camera 100 includes a face registration mode. The camera 100 registers, in advance, feature information indicating a feature amount of a face of a detected person in dictionary data (hereinafter referred to as "recognition-purpose dictionary data") in the face registration mode. For example, a feature amount of an organ such as eyes and a mouth is used as a feature amount of a face. In a case where personal recognition is performed, the subject detection unit 140 extracts a feature amount of a face of a detected person, and calculates a degree of similarity between the extracted feature amount and the feature amount of a face that has been registered in advance in recognition-purpose dictionary data. Then, the subject detection unit 140 determines whether the face of the detected person is the face of a person registered in the recognition-purpose dictionary data by determining whether the degree of similarity is equal to or higher than a predetermined threshold. In this way, an individual is specified (personal recognition).

An orientation obtainment unit 142 obtains orientation information by performing orientation estimation with respect to each of a plurality of subjects detected by the subject detection unit 140. The content of orientation information to be obtained is determined depending on a subject type. It is assumed that, in a case where a subject is a person, the orientation obtainment unit 142 obtains the positions of a plurality of joints of the person.

Note that any method may be used as an orientation estimation method; for example, a method described in the following document can be used. The details of the obtainment of orientation information will be described later.

Cao, Zhe, et al., "Realtime multi-person 2d pose estimation using part affinity fields.", Proceedings of the IEEE Conference on Computer Vision and Pattern Recognition, 2017.

Figure 2:
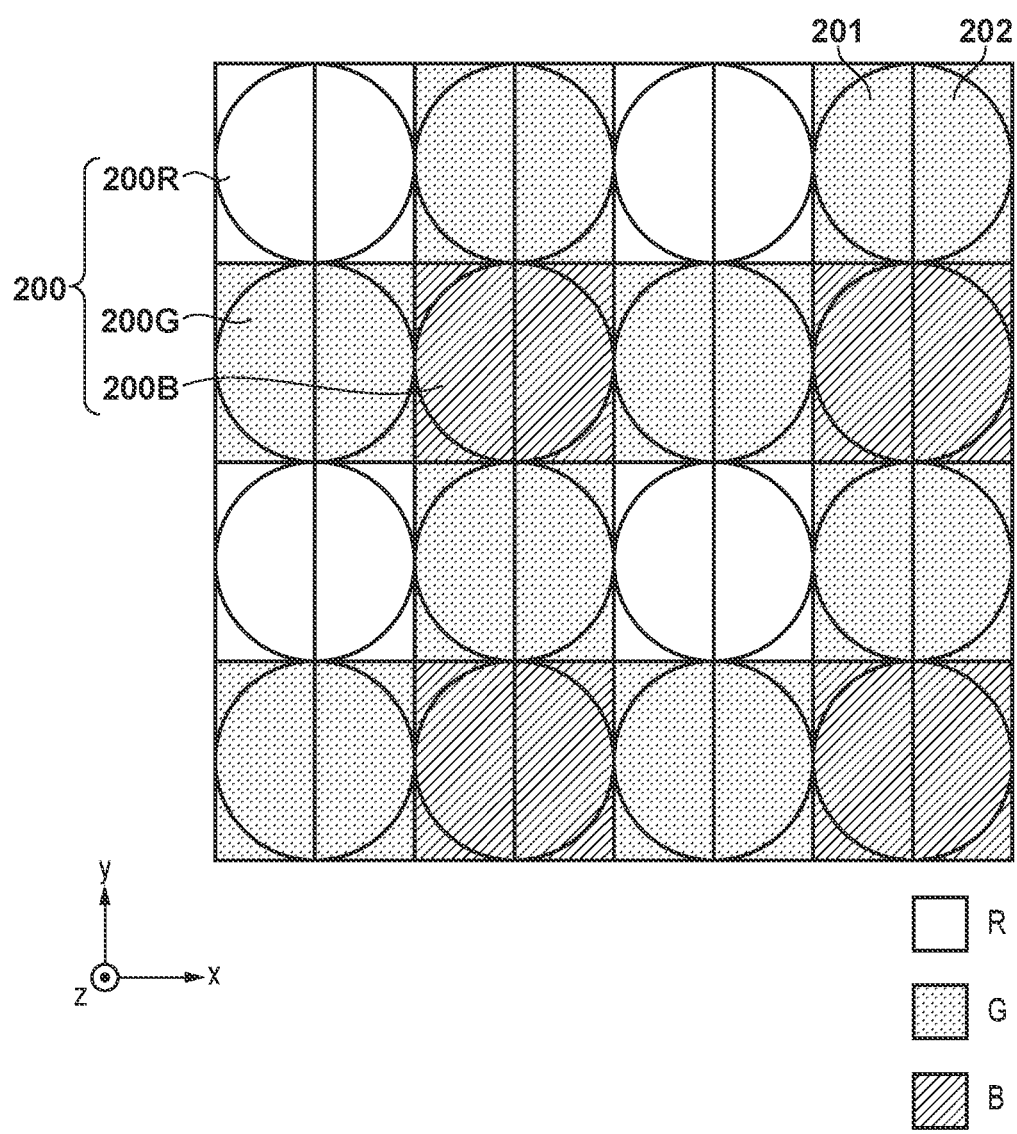
FIG. 2 is a diagram for describing a pixel arrangement of an image sensor 107.

Next, a pixel arrangement of the image sensor 107 will be described using FIG. 2. FIG. 2 shows a pixel arrangement in the range of four pixel columns×four pixel rows in the image sensor 107, as viewed along the optical axis direction (z direction).

One pixel unit 200 includes four image capturing pixels arranged in two rows×two columns. As a result of arranging a large number of pixel units 200 on the image sensor 107, a two-dimensional subject image can be photoelectrically converted. In one pixel unit 200, an image capturing pixel 200R (hereinafter referred to as an R pixel) with a spectral sensitivity corresponding to R (red) is arranged at the upper left, and an image capturing pixel 200G (hereinafter referred to as a G pixel) with a spectral sensitivity corresponding to G (green) is arranged at the upper right and the lower left. Furthermore, an image capturing pixel 200B (hereinafter referred to as a B pixel) with a spectral sensitivity corresponding to B (blue) is arranged at the lower right. Also, each image capturing pixel includes a first focus detection pixel 201 and a second focus detection pixel 202 as a result of division in the horizontal direction (x direction).

In the image sensor 107 of the present embodiment, a pixel pitch P of the image capturing pixels is 4 μm, and the number N of the image capturing pixels is 5575 columns horizontally (x)×3725 rows vertically (v)=approximately 20.75 megapixels. Furthermore, the pixel pitch PAF of the focus detection pixels is 2 μm, and the number NAF of the focus detection pixels is 11150 columns horizontally×3725 rows vertically=approximately 41.5 megapixels.

Although the present embodiment is described in relation to a case where each image capturing pixel is divided into two parts in the horizontal direction, it may be divided in the vertical direction. Also, while the image sensor 107 of the present embodiment includes a plurality of image capturing pixels that each include the first and second focus detection pixels, the image capturing pixels and the first and second focus detection pixels may be provided as separate pixels. For example, the first and second focus detection pixels may be arranged discretely among the plurality of image capturing pixels.

Figures 3A, 3B:
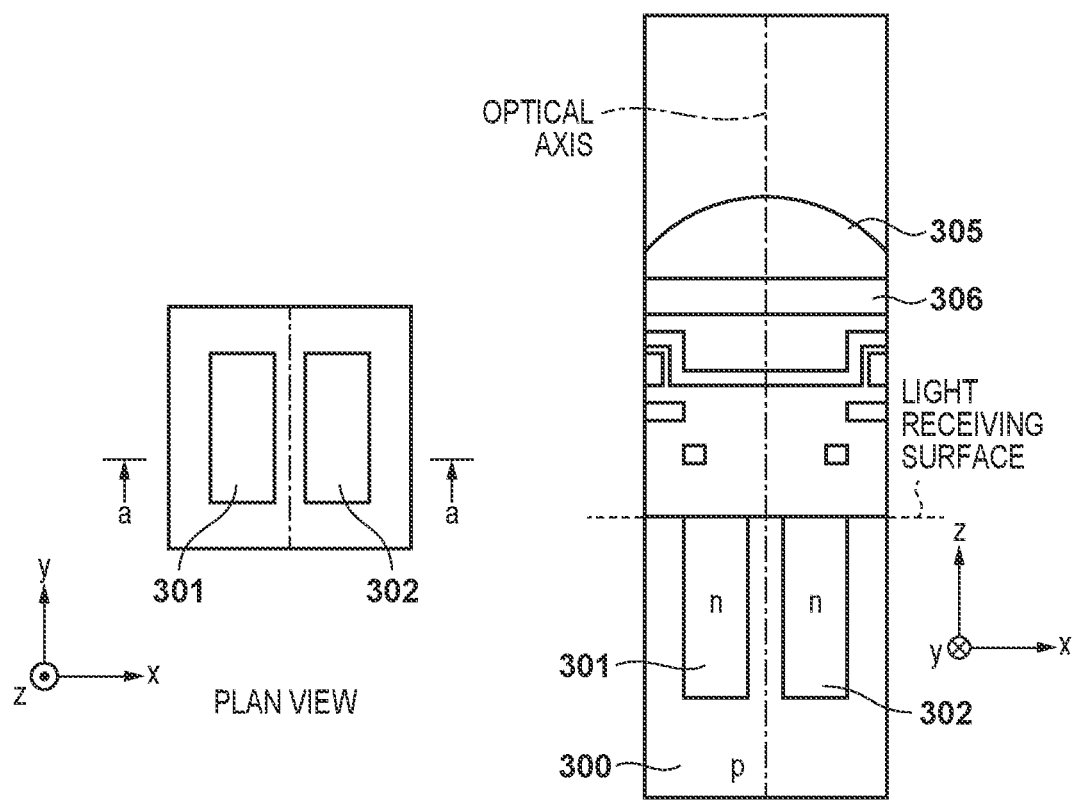
FIGS. 3A and 3B are diagrams showing a structure of an image capturing pixel.

FIGS. 3A and 3B are diagrams showing a structure of an image capturing pixel. FIG. 3A shows one image capturing pixel (an image capturing pixel 200R, 200G, or 200B) as viewed along the light receiving surface side of the image sensor 107 (the +z direction). FIG. 3B shows an a-a cross-section of the image capturing pixel of FIG. 3A as viewed along the −y direction. As shown in FIG. 3B, one image capturing pixel is provided with one microlens 305 for collecting incident light.

Furthermore, the image capturing pixel is provided with photoelectric conversion units 301 and 302 as a result of division into N parts (in the present embodiment, division into two parts) in the x direction. The photoelectric conversion units 301 and 302 are equivalent to the first focus detection pixel 201 and the second focus detection pixel 202, respectively. The centers of mass of the photoelectric conversion units 301 and 302 are decentered toward the −x side and the +x side, respectively, relative to the optical axis of the microlens 305.

In each image capturing pixel, a color filter 306 in R, G, or B is provided between the microlens 305 and the photoelectric conversion units 301 and 302. Note that the spectral transmittance of the color filter may vary with each photoelectric conversion unit, or the color filter may be omitted.

Light that has been incident on the image capturing pixel from the image capturing optical system is collected by the microlens 305, dispersed by the color filter 306, and then received and photoelectrically converted by the photoelectric conversion units 301 and 302.

Figure 4:
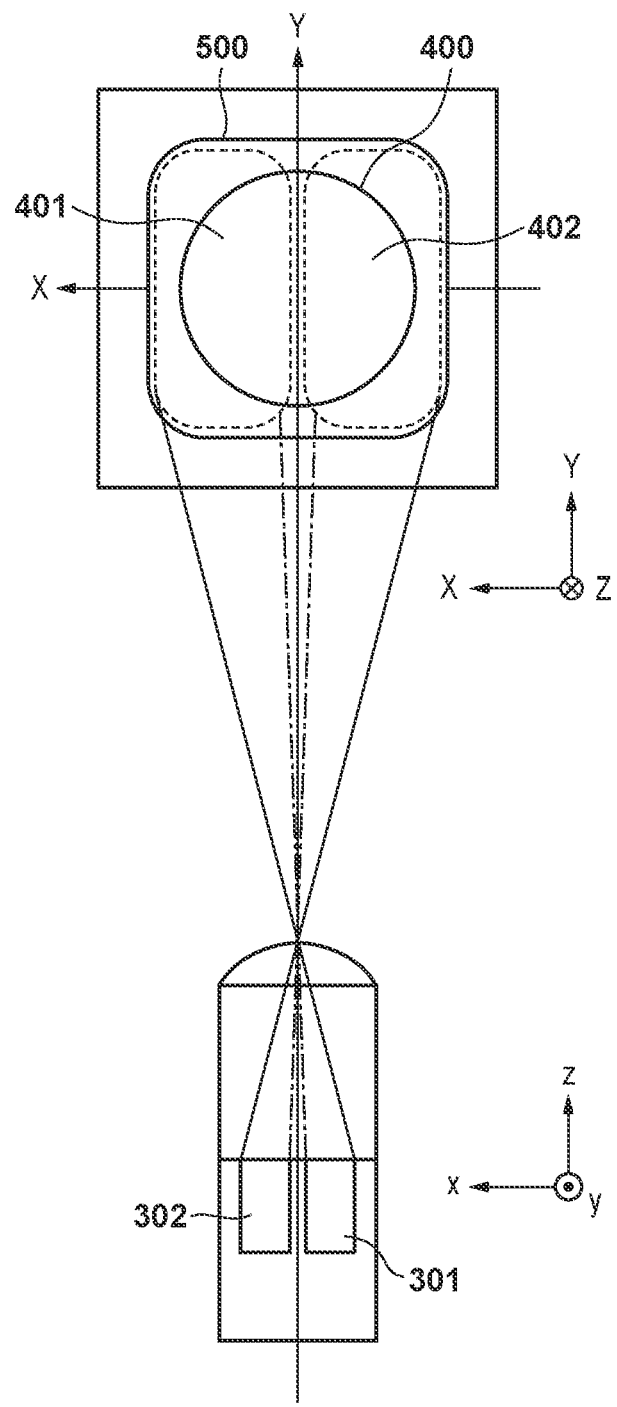
FIG. 4 is a diagram for describing a relationship between a structure of an image capturing pixel and pupil division.

Next, the relationship between the structure of an image capturing pixel shown in FIGS. 3A and 3B and pupil division will be described using FIG. 4. FIG. 4 shows an a-a cross-section of an image capturing pixel shown in FIG. 3A as viewed from the +y side, and also shows an exit pupil 400 of the image capturing optical system. In FIG. 4, for the sake of consistency with the coordinate axes of the exit pupil 400, the x direction and the y direction of the image capturing pixel are inverted relative to FIG. 3B.

In the exit pupil 400, a first pupil region 401 with a center of mass that has been decentered toward the +x side is a region that has been, due to the microlens 305, brought into a substantially conjugate relationship with a light receiving surface of the photoelectric conversion unit 301 on the −x side in the image capturing pixel. A light beam that has passed through the first pupil region 401 is received by the photoelectric conversion unit 301, namely the first focus detection pixel 201. Also, in the exit pupil 400, a second pupil region 402 with a center of mass that has been decentered toward the −x side is a region that has been, due to the microlens 305, brought into a substantially conjugate relationship with a light receiving surface of the photoelectric conversion unit 302 on the +x side in the image capturing pixel. A light beams that has passed through the second pupil region 402 is received by the photoelectric conversion unit 302, namely the second focus detection pixel 202. A pupil region 500 represents a pupil region throughout which the entire image capturing pixel, or the combination of the entire photoelectric conversion units 301 and 302 (first and second focus detection pixels 201 and 202), can receive light.

Figure 5:
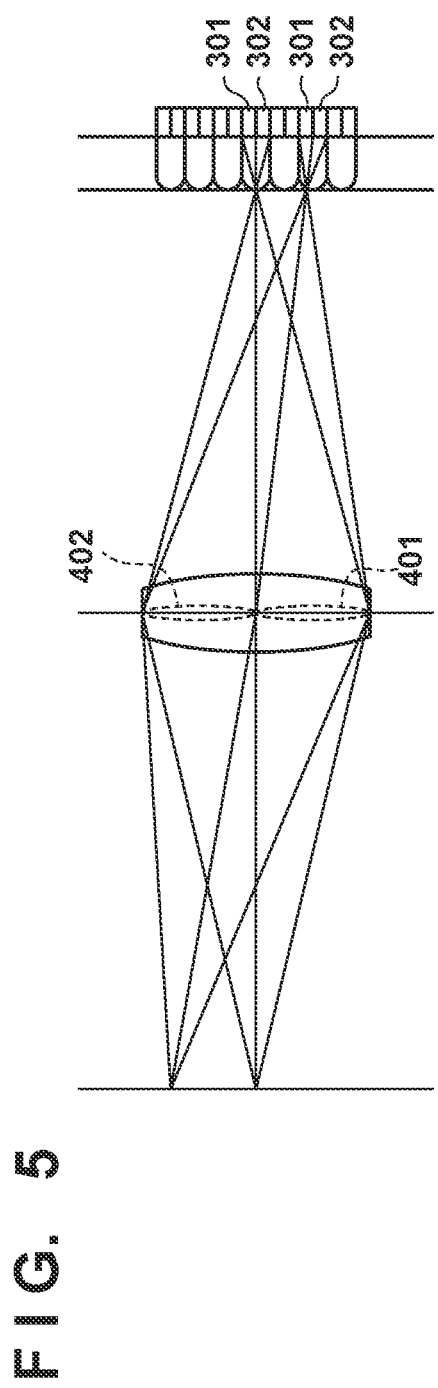
FIG. 5 is a diagram showing pupil division according to the image sensor 107.

FIG. 5 shows pupil division according to the image sensor 107. A pair of light beams that have passed through the first pupil region 401 and the second pupil region 402, respectively, is incident on the respective pixels in the image sensor 107 at different angles, and is received by the first and second focus detection pixels 201 and 202 representing the two divided parts. In the present embodiment, the camera 100 generates a first focus detection signal by collecting output signals from a plurality of first focus detection pixels 201 in the image sensor 107, and generates a second focus detection signal by collecting output signals from a plurality of second focus detection pixels 202. Furthermore, the camera 100 generates an image capturing pixel signal by adding together the output signals from the first focus detection pixels 201 and the output signals from the second focus detection pixels 202 in a plurality of image capturing pixels. Then, the camera 100 composites together the image capturing pixel signals from the plurality of image capturing pixels, thereby generating a captured signal for generating an image of a resolution equivalent to the number N of effective pixels.

Figure 6:
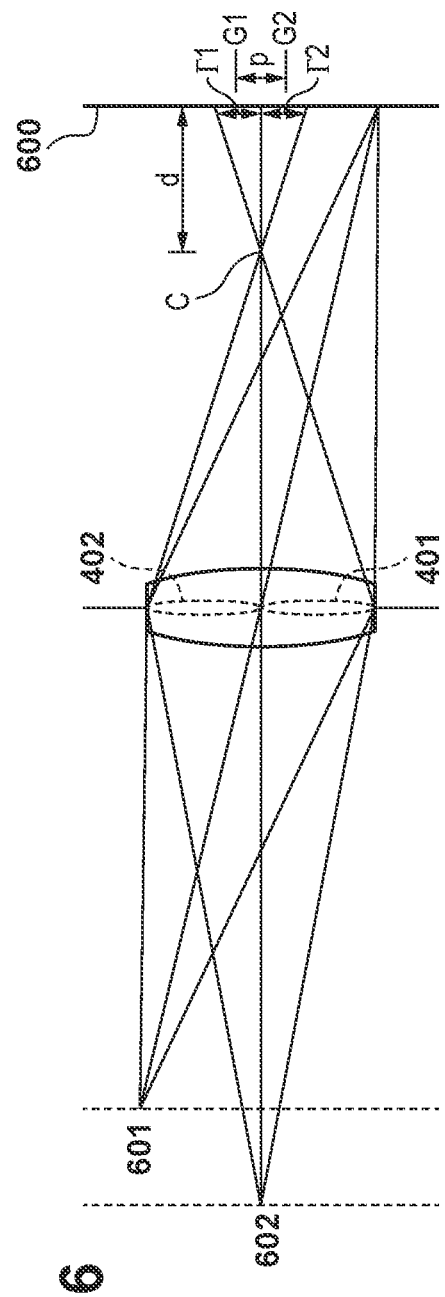
FIG. 6 is a diagram for describing a relationship between a defocus amount of an image capturing optical system and a phase difference (an image displacement amount) between a first focus detection signal and a second focus detection signal obtained from the image sensor 107.

Next, with reference to FIG. 6, a description is given of the relationship between a defocus amount of the image capturing optical system and a phase difference between a first focus detection signal and a second focus detection signal obtained from the image sensor 107 (an image displacement amount). In the figure, the image sensor 107 is arranged on an image capturing plane 600. As has been described with reference to FIG. 4 and FIG. 5, the exit pupil 400 of the image capturing optical system is divided into two parts, namely the first pupil region 401 and the second pupil region 402. It is assumed that the distance (magnitude) between an image forming position C of light beams from a subject 601 or 602 and the image capturing plane 600 is |d|. In this case, a defocus amount d is defined in such a manner that it indicates a front focus state, in which the image forming position C is closer to the subject side than the image capturing plane 600 is, using a negative sign (d<0), and indicates a rear focus state, in which the image forming position C is farther from the subjects than the image capturing plane 600 is, using a positive sign (d>0). In an in-focus state where the image forming position C is on the image capturing plane 600, d=0. The image capturing optical system is in the in-focus state (d=0) with respect to the subject 601, and is in the front focus state (d<0) with respect to the subject 602. The front focus state (d<0) and the rear focus state (d>0) are collectively referred to as a defocus state (|d|>0).

In the front focus state (d<0), among the light beams from the subject 602, a light beam that has passed through the first pupil region 401 (second pupil region 402) is collected, and then dispersed to have a width Γ1 (Γ2) centered at a mass center position G1 (G2) of the light beam, thereby forming a blurred image on the image capturing plane 600. Each first focus detection pixel 201 (each second focus detection pixel 202) in the image sensor 107 receives light of this blurred image, and generates a first focus detection signal (second focus detection signal). That is to say, the first focus detection signal (second focus detection signal) becomes a signal indicating a subject image of the subject 602 that has been blurred by the blur width Γ1 (Γ2) at the mass center position G1 (G2) of the light beam on the image capturing plane 600.

The blur width Γ1 (Γ2) of the subject image increases substantially in proportion to an increase in the magnitude |d| of the defocus amount d. Similarly, a magnitude |p| of an amount p of image displacement between the first focus detection signal and the second focus detection signal (=the difference between the mass center positions of the light beams, or G1-G2) also increases substantially in proportion to an increase in the magnitude |d| of the defocus amount d. The same goes for the rear focus state (d>0), although the direction of image displacement between the first focus detection signal and the second focus detection signal is opposite to that in the front focus state.

As described above, the magnitude of the amount of image displacement between the first and second focus detection signals increases with an increase in the magnitude of the defocus amount. In the present embodiment, the camera 100 performs focus detection using an image capturing plane phase-difference detection method, in which a defocus amount is calculated from an amount of image displacement between the first and second focus detection signals obtained using the image sensor 107.

Figure 7:
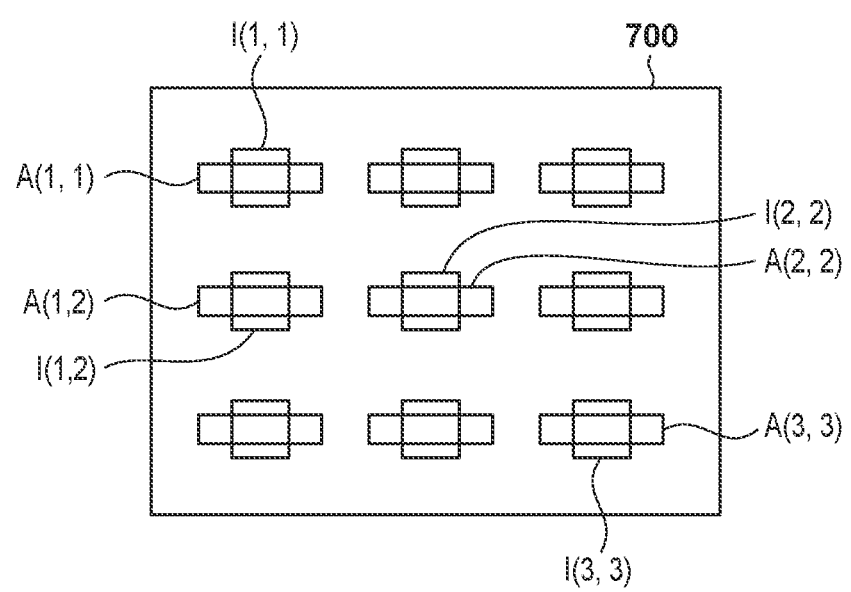
FIG. 7 is a diagram for describing focus detection regions in which first and second focus detection signals are obtained in the image sensor 107.

Next, with reference to FIG. 7, a description is given of focus detection regions in which the first and second focus detection signals are obtained in the image sensor 107. In FIG. 7, A (n, m) represents a focus detection region which is included among a plurality of focus detection regions (a total of nine; three in each of the x direction and the y direction) set in an effective pixel region 700 of the image sensor 107, and which is the $n^{th}$ in the x direction and the $m^{th}$ in the y direction. First and second focus detection signals are generated from output signals from the plurality of first and second focus detection pixels 201 and 202 included in the focus detection region A (n, m). I (n, m) represents an index that shows the position of the focus detection region A (n, m) on the display unit 131.

Note that the nine focus detection regions shown in FIG. 7 are merely examples: the number, the positions, and the size of the focus detection regions are not limited. For example, it is permissible to adopt a configuration in which one or more regions are set as focus detection regions in a predetermined range centered at a position designated by the user or a subject position detected by the subject detection unit 140. The camera 100 can arrange the focus detection regions so that focus detection results with a higher resolution can be achieved in order to obtain a defocus map. For example, the camera 100 arranges, on the image sensor 107, a total of 9600 focus detection regions obtained through division into 120 parts horizontally, and division into 80 parts vertically.

Predictive Shooting Processing

Figure 8:
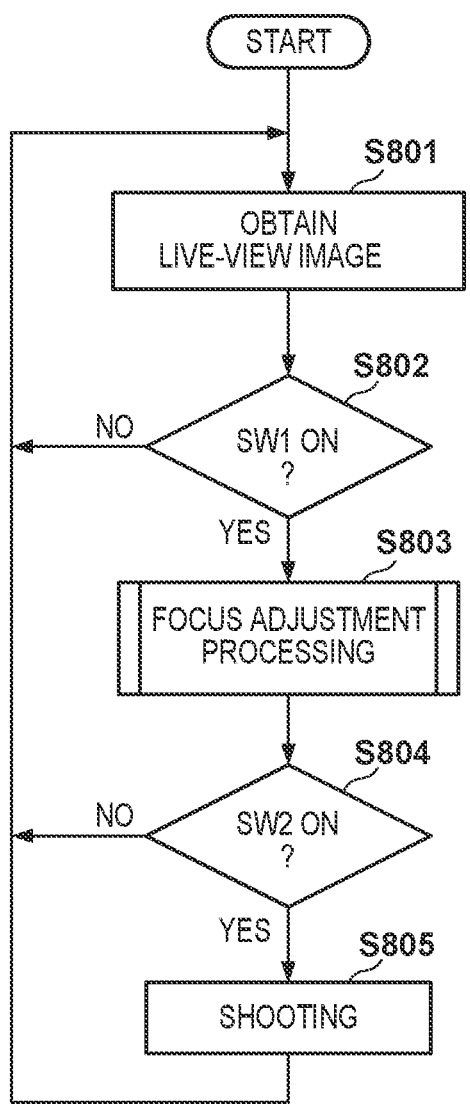
FIG. 8 is a flowchart showing predictive shooting processing.

FIG. 8 is a flowchart showing predictive shooting processing according to the first embodiment. The camera 100 has a mode in which the lenses are driven with respect to an image plane of a subject at certain time (a one-shot shooting mode), and a mode in which the lenses are driven while predicting an image plane of a subject at time that is after the current time (a predictive shooting mode). When the camera 100 has been set to the predictive shooting mode, processing of the present flowchart is started. Processing of each step of the present flowchart is realized by the CPU 121 executing a computer program stored in the ROM, unless specifically stated otherwise.

In step S801, the CPU 121 obtains a live-view image. Specifically, the CPU 121 obtains captured data by causing the image sensor driving circuit 124 to drive the image sensor 107. Thereafter, the CPU 121 obtains, from among the obtained captured data, first and second focus detection signals from the plurality of first and second focus detection pixels included in each of the plurality of focus detection regions shown in FIG. 7. Also, the CPU 121 generates a captured signal by adding together the first and second focus detection signals of all effective pixels in the image sensor 107, and obtains image data by causing the image processing circuit 125 to execute image processing with respect to the captured signal (captured data). Note that in a case where the image capturing pixels and the first and second focus detection pixels are provided separately, the CPU 121 obtains image data by executing supplement processing with respect to the focus detection pixels. The CPU 121 causes the image processing circuit 125 to generate a live-view image from the obtained image data, and causes the display unit 131 to display the live-view image. Note that the live-view image is a reduced image that have been brought into conformity with the resolution of the display unit 131, and the user can adjust a composition for image capturing, exposure conditions, and the like while viewing them. The CPU 121 makes exposure adjustments based on photometric value obtained from the image data, and performs display on the display unit 131. The exposure adjustments are realized by making gain adjustments as appropriate in connection with an exposure time period, opening/closing of the diaphragm aperture for the photographing lenses, and the output from the image sensor 107.

In step S802, the CPU 121 determines a state of a switch SW1 that issues an instruction for starting an image capturing preparation operation. The switch SW1 is turned ON when the release switch included in the operation switch 132 is placed in a half-depressed state. When the switch SW1 is ON, processing proceeds to step S803. When SW1 is OFF, processing returns to step S801.

In step S803, the CPU 121 performs control to execute focus adjustment processing. The details of the focus adjustment processing will be described later using FIG. 9.

In step S804, the CPU 121 determines a state of a switch SW2 that issues an instruction for starting a shooting operation. The switch SW2 is turned ON when the release switch included in the operation switch 132 is placed in a fully-depressed state. When the switch SW2 is OFF, processing returns to step S801. When the switch SW2 is ON, processing proceeds to step S805.

In step S805, the CPU 121 performs control to carry out shooting by causing the diaphragm driving circuit 128, the shutter 108, and the image sensor driving circuit 124 to operate. After the image processing circuit 125 has applied image processing to an image that has been shot, the image is stored into the flash memory 133 as a shot image. Thereafter, processing returns to step S801.

Focus Adjustment Processing

Figure 9:
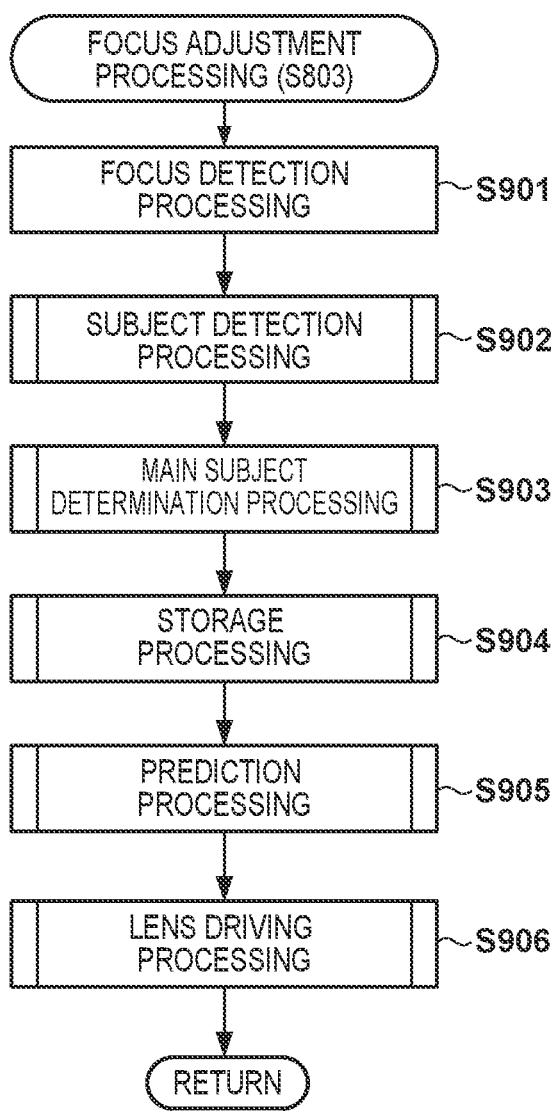
FIG. 9 is a flowchart showing the details of focus adjustment processing (step S803).

FIG. 9 is a flowchart showing the details of the focus adjustment processing (step S803). In step S901, the CPU 121 executes focus detection processing. In the focus detection processing, with respect to each of the plurality of focus detection regions, the CPU 121 calculates an amount of image displacement between the first and second focus detection signals obtained in step S801, and calculates a defocus amount from the amount of image displacement. As stated earlier, in the present embodiment, the total of 9600 focus detection regions obtained through division into 120 parts horizontally, and division into 80 parts vertically, are arranged in the image sensor 107. A group of focus detection results obtained from these 9600 focus detection regions is called a defocus map.

In step S902, the CPU 121 executes subject detection processing. The details of the subject detection processing will be described later using a flowchart of FIG. 10.

In step S903, the CPU 121 executes main subject determination processing. The details of the main subject determination processing will be described later using a flowchart of FIG. 14.

In step S904, the CPU 121 executes storage processing. The details of the storage processing will be described later using a flowchart of FIG. 15.

In step S905, the CPU 121 executes prediction processing. The details of the prediction processing will be described later using a flowchart of FIG. 16.

In step S906, the CPU 121 executes lens driving processing. The details of the lens driving processing will be described later using a flowchart of FIG. 17.

Subject Detection Processing

FIG. 10 is a flowchart showing the details of the subject detection processing (step S902). In step S1001, the CPU 121 sets pieces of detection-purpose dictionary data corresponding to the types of subjects that are desired to be detected. For example, in accordance with classification of subjects such as "person", "vehicle", and "animal", pieces of detection-purpose dictionary data corresponding to the respective types of subjects are stored in the dictionary data storage unit 141. The number of pieces of detection-purpose dictionary data that are set here may be one or more. The user can set, in advance, the types of subjects that are desired to be detected on a setting menu of the camera 100; in step S1001, the CPU 121 sets pieces of detection-purpose dictionary data corresponding to the types of subjects that have been set in advance by the user. In the following description, it is assumed that a piece of detection-purpose dictionary data corresponding to "person" and a piece of detection-purpose dictionary data corresponding to "ball" are set in step S1001.

In step S1002, the CPU 121 controls the subject detection unit 140 to perform subject detection with respect to the image data that has been read out in step S801, using the pieces of detection-purpose dictionary data set in step S1001 ("person" and "ball"). At this time, the subject detection unit 140 outputs information of the positions, sizes, reliability degrees, and the like of the detected subjects. At this time, the CPU 121 may display the information output from the subject detection unit 140 on the display unit 131.

Regarding detection of a person, the subject detection unit 140 detects a plurality of regions hierarchically from the image data. For example, the subject detection unit 140 detects a plurality of organ regions (local regions) including a "whole body" region, a "face" region, an "eye" region, and the like. In many cases, a local region such as the eyes and the face of a person is a region that is desired to be in focus or in an appropriate exposure state as a subject. Meanwhile, there are cases where a local region cannot be detected depending on a surrounding obstacle or a facial direction. Even in such cases, detecting a whole body enables robust and continuous detection of a subject. For this reason, the present embodiment adopts a configuration in which a subject is detected hierarchically.

After performing subject detection related to a person, the CPU 121 changes to the piece of detection-purpose dictionary data corresponding to "ball", and controls the subject detection unit 140 to detect a ball. Regarding detection of a ball, a region of the entire ball is detected. The subject detection unit 140 outputs the central position and the size of the ball.

Note that any method may be used for object detection; for example, a method described in the following document can be used.

Redmon, Joseph, et al., "You only look once: Unified, real-time object detection.", Proceedings of the IEEE conference on computer vision and pattern recognition, 2016.

In step S1003, the CPU 121 tracks a main subject. Specifically, the CPU 121 executes known template matching processing using a region of a main subject that has been determined in the image data obtained through processing of the previous step S801 as a template. That is to say, the CPU 121 tracks a main subject by, with use of the region of the last main subject as a template, searching for a similar region within the image data that has been obtained through processing of the present step S801. The main subject that has been identified by the tracking is used in a case where it has not been possible to determine a main subject from among the subjects detected in step S1002 (the details will be described later with reference to FIG. 14).

As information used in template matching, any information may be used, such as luminance information, color histogram information, and information of feature points including corners, edges, etc. A variety of methods are possible as a matching method and a template update method: any method may be used thereas.

Next, in step S1004, the CPU 121 executes personal recognition processing with respect to a person detected in step S1002.

A description is now given of the details of the personal recognition processing of step S1004 with reference to FIG. 11. In step S1102, the CPU 121 extracts a feature amount. Specifically, based on the organs detected in a face region of the person detected in step S1002, the CPU 121 extracts a feature amount of a face of the person. Note that in a case where a plurality of persons have been detected in step S1102, the CPU 121 extracts a feature amount of a face with respect to each of the plurality of persons.

In step S1103, the CPU 121 calculates degrees of similarity. Specifically, using pattern matching or the like, the CPU 121 calculates degrees of similarity between the feature amount extracted in step S1102 and the feature amounts of the respective faces that have been registered in advance in the recognition-purpose dictionary data. Note that in a case where a plurality of persons have been detected in step S1102, the CPU 121 calculates degrees of similarity with respect to each of the plurality of persons.

In step S1104, the CPU 121 performs personal recognition. Specifically, the CPU 121 determines whether the highest degree of similarity among the plurality of degrees of similarity that have been calculated in step S1103 with respect to the person detected in step S1002, is equal to or higher than a predetermined threshold. In a case where the highest degree of similarity is equal to or higher than the predetermined threshold, the CPU 121 recognizes that the person detected in step S1002 is a person with a face that corresponds to the highest degree of similarity among the plurality of faces that have been registered in advance in the recognition-purpose dictionary data. In a case where the highest degree of similarity is lower than the predetermined threshold, the CPU 121 determines that the person detected in step S1002 is an unknown person (a person who has not been registered in the recognition-purpose dictionary data). Note that in a case where a plurality of persons have been detected in step S1102, the CPU 121 performs personal recognition with respect to each of the plurality of persons.

Returning to FIG. 10, in step S1005, the CPU 121 controls the orientation obtainment unit 142 to obtain orientation information of a person detected in step S1002.

Figure 12A:
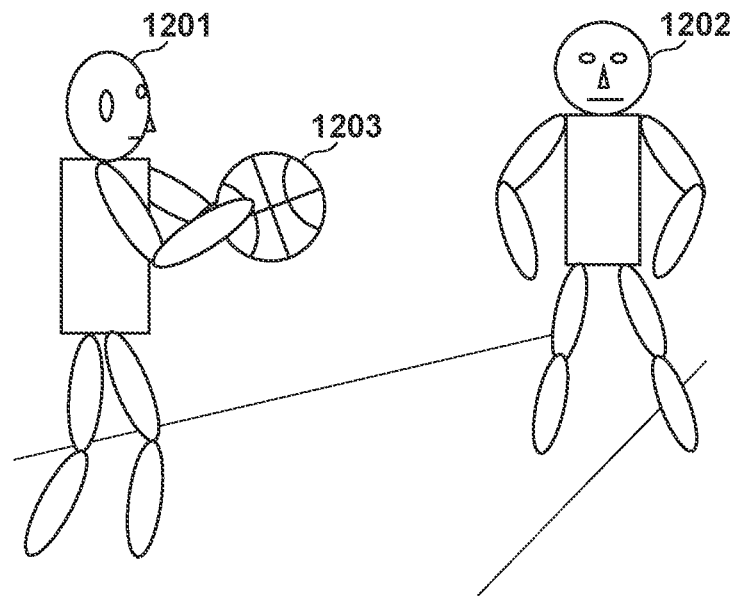
FIGS. 12A and 12B are conceptual diagrams of information obtained by an orientation obtainment unit 142.
Figure 12B:
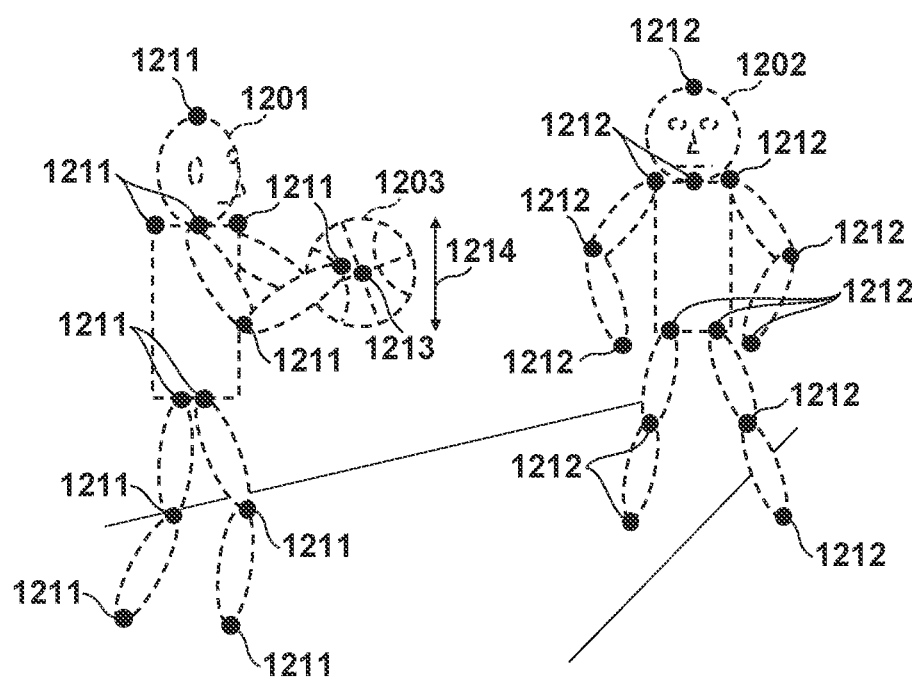

FIGS. 12A and 12B are conceptual diagrams of information obtained by the orientation obtainment unit 142. FIG. 12A shows an image to be processed, in which a subject 1201 has caught a ball 1203. The subject 1201 is a crucial subject within a scene of shooting. In the present embodiment, a subject who has a high possibility of being an intended target of focus by a photographer (a main subject) is determined by using pieces of orientation information of subjects. On the other hand, a subject 1202 is a non-main subject. It is assumed here that the non-main subject denotes a subject other than the main subject.

FIG. 12B is a diagram showing examples of pieces of orientation information of the subjects 1201 and 1202, and the position and the size of the ball 1203. Joints 1211 represent the respective joints of the subject 1201, whereas joints 1212 represent the respective joints of the subject 1202. FIG. 12B shows an example in which the positions of the top of a head, a neck, shoulders, elbows, wrists, a waist, knees, and ankles are obtained as joints; however, a part of these may be used as the joint positions, or other positions may be obtained thereas. Furthermore, not only the joint positions but also information of, for example, an axis connecting between joints may be used: any information can be used as orientation information as long as it is information indicating an orientation of a subject. The following describes a case where the joint positions are obtained as orientation information.

The orientation obtainment unit 142 obtains the two-dimensional coordinates (x, y) of the joints 1211 and the joints 1212 within the image. Here, the unit of (x, y) is pixels. A mass center position 1213 represents a mass center position of the ball 1203, and an arrow 1214 indicates the size of the ball 1203 within the image. The subject detection unit 140 obtains the two-dimensional coordinates (x, y) of the mass center position of the ball 1203 within the image, and the number of pixels indicating the width of the ball 1203 within the image.

Next, in step S1006, the CPU 121 determines the likelihood of being a main subject based on the orientation information obtained in step S1005. The "likelihood of being a main subject" means a reliability degree corresponding to a degree of possibility that a specific subject is a main subject in an image to be processed. First, a method of calculating a reliability degree indicating the likelihood of being a main subject will be described. Note that the following describes a case where a probability that a specific subject is a main subject in an image to be processed is adopted as a reliability degree indicating the likelihood of being a main subject: however, a value other than the probability may be used. For example, the reciprocal of a distance between a mass center position of a subject and a mass center position of a specific object can be used as a reliability degree.

A description is given of a method of calculating a probability indicating the likelihood of being a main subject based on the coordinates and the size of each joint of a person. The following describes a case where a neural network, which is one method of machine learning, is used.

Figure 13:
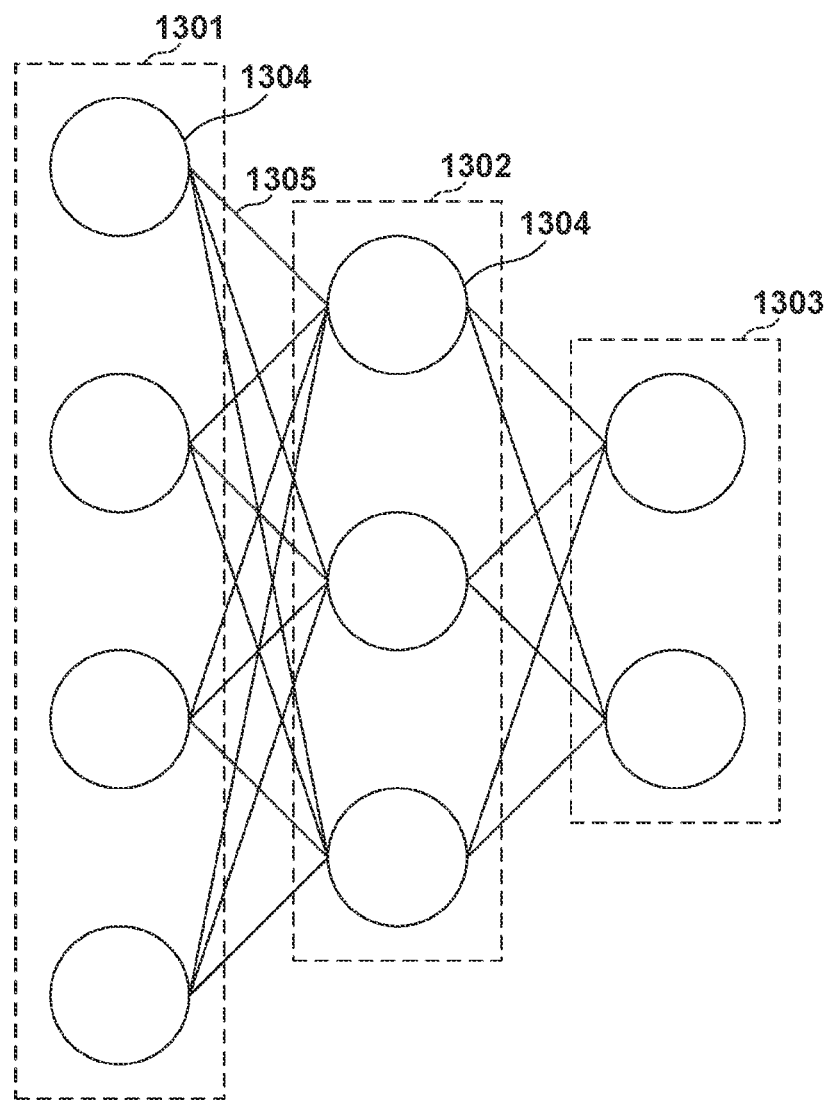
FIG. 13 is a diagram showing an example of a structure of a neural network.

FIG. 13 is a diagram showing an example of a structure of a neural network. In FIG. 13, 1301 indicates an input layer, 1302 indicates an intermediate layer, 1303 indicates an output layer, 1304 indicates neurons, and 1305 indicates connection relationships among the neurons 1304. Here, for the sake of convenience of illustration, numerals are given only to representative neurons and connection lines. It is assumed that the number of neurons 1304 in the input layer 1301 is equal to the dimension of input data, and the number of neurons in the output layer 1303 is two. This corresponds to the issue of binary classification in which whether a subject is likely to be a main subject is determined.

A weight $w_{ij}$ is given to a line 1305 connecting between the $i^{th}$ neuron 1304 in the input layer 1301 and the $j^{th}$ neuron 1304 in the intermediate layer 1302, and a value $z_j$ output from the $j^{th}$ neuron 1304 in the intermediate layer 1302 is provided by the following equation.

$$z_j = h\left(b_j + \sum_i w_{ji}x_i\right) \quad (1)$$

$$h(z) = \max(z, 0) \quad (2)$$

In equation (1), $x_i$ denotes a value input to the $i^{th}$ neuron 1304 in the input layer 1301. It is assumed that the sum is yielded in relation to all of the neurons 1304 in the input layer 1301 that are connected to the $j^{th}$ neuron. $b_j$ is called a bias, and is a parameter for controlling ease of firing of the $j^{th}$ neuron 1304. Also, a function h defined by equation (2) is an activating function called a Rectified Linear Unit (ReLU). Another function such as a sigmoid function can also be used as the activating function.

Furthermore, a value $y_k$ output from the $k^{th}$ neuron 1304 in the output layer 1303 is provided by the following equation.

$$y_k = f\left(b_k + \sum_j w_{kj}z_j\right) \quad (3)$$

$$f(y_k) = \frac{\exp(y_k)}{\sum_i \exp(y_i)} \quad (4)$$

In equation (3), $z_j$ represents a value output from the $j^{th}$ neuron 1304 in the intermediate layer 1302, where i, k=0, 1. 0 corresponds to the likelihood of being a non-main subject, whereas 1 corresponds to the likelihood of being a main subject. It is assumed that the sum is yielded in relation to all of the neurons in the input layer 1302 that are connected to the $k^{th}$ neuron. Moreover, a function f defined by equation (4) is called a softmax function, and outputs a probability value that belongs to the $k^{th}$ class. In the present embodiment, f ($y_1$) is used as a probability indicating the likelihood of being a main subject.

During training, the coordinates of joints of a person and the coordinates and the size of a ball are input. Then, all weights and biases are optimized so as to minimize a loss function that uses the output probability and a ground truth label. It is assumed here that the ground truth label takes two values: "1" in the case of a main subject, and "0" in the case of a non-main subject. A binary cross-entropy indicated below can be used as a loss function L.

$$L(y, t) = -\sum_m t_m \log y_m - \sum_m (1 - t_m)\log(1 - y_m) \quad (5)$$

In equation (5), a subscript m represents an index for a subject that is a training target. $y_m$ is a probability value output from a neuron 1304 of k=1 in the output layer 1303, and $t_m$ is a ground truth label. Any function other than equation (5) may be used as the loss function as long as it is a function that can measure a degree of coincidence with the ground truth label, such as a mean squared error. By performing optimization based on equation (5), weights and biases can be determined so as to bring the output probability value close to the ground truth label. Weights and bias values that have already been obtained through training are stored in advance to the flash memory 133, and stored to the RAM in the CPU 121 as necessary. A plurality of types of weights and bias values may be prepared depending on the scenes. The CPU 121 outputs the probability value f ($y_1$) based on equation (1) to equation (4) with use of weights and biases that have already been obtained through training (the results of machine learning that has been performed in advance).

Note, at the time of training, a state before transition to a crucial action can be learned as the state of likelihood of being a main subject. For example, in a where a ball is thrown, a state where a person is extending their arms forward when throwing the ball can be learned as one of the states of likelihood of being the main subject. The reason why this configuration is adopted is because, when the main subject has actually taken a crucial action, control of the camera 100 needs to be executed accurately. For example, by starting control for automatic recording of images and videos (recording control) in a case where a reliability degree (probability) corresponding to the likelihood of being the main subject has exceeded a preset threshold, the photographer can perform shooting without missing a crucial moment. At this time, depending on the state of the training target, information of a typical time period until the crucial action may be used in control of the camera 100.

Although the foregoing has described a method of calculating a probability using a neural network, another machine learning method such as a support vector machine and a decision tree may be used as long as it can perform class classification regarding whether a subject is likely to be a main subject. Furthermore, no limitation is intended by machine learning: a function that outputs reliability degrees or probability values based on a certain model may be constructed. It is also possible to use a value of a monotonically decreasing function for the distance between a person and a ball, under the assumption that the shorter the distance between the person and the ball, the higher the reliability of the person being likely to be a main subject.

Note that although it has been assumed here that the likelihood of being a main subject is determined using information of a ball as well, it is also possible to determine the likelihood of being a main subject using only orientation information of a subject. There are cases where it is favorable to use information of a ball as well, and cases where it is not favorable to do so, depending on the type of orientation information of a subject (e.g., passing, shooting, etc.). For example, in the case of shooting, there are cases where the photographer wishes to consider that a subject who has taken a shot is likely to be a main subject although the distance between the person and the ball is long: therefore, the likelihood of being a main subject may be determined using only orientation information of the person who is the subject, without using information of the ball. Also, the likelihood of being a main subject may be determined using the information of the ball as well depending on the type of orientation information of the subject. In addition, data obtained by applying a predetermined transformation such as a linear transformation to the coordinates of each joint and the coordinates and the size of the ball may be used as input data. Furthermore, in a case where two subjects that are different from each other in terms of defocus frequently alternate as a subject that is likely to be a main subject, this is often different from the intention of the photographer: therefore, the frequent alternation may be detected from chronological pieces of data of the reliability degrees of the respective subjects. In this case, for example, when there are two subjects, alternation of the main subject may be prevented by increasing the reliability degree of one of the subjects (e.g., a subject on the near side). Alternatively, a region that includes the two subjects may be set as a region indicating the likelihood of being a main subject.

Furthermore, as another method, chronological pieces of data of pieces of orientation information of persons, the positions of persons and the ball, the defocus amounts of the respective subjects, and the reliability degrees indicating the likelihood of being a main subject, may be used as input data.

Once processing of step S1006 has ended, the CPU 121 ends the subroutine of the subject detection processing, and processing proceeds to step S903 of FIG. 9.

Main Subject Determination Processing

Figure 14:
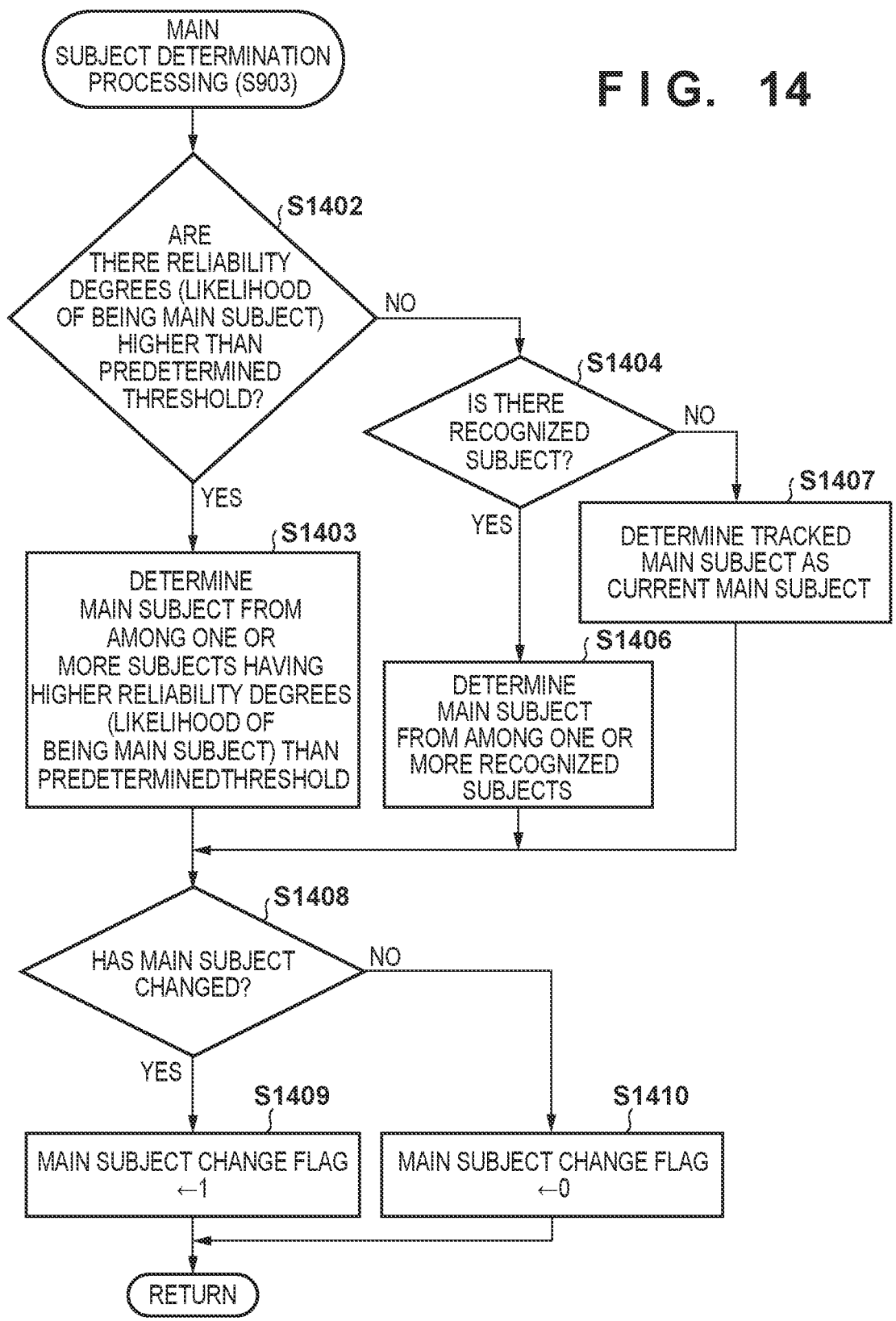
FIG. 14 is a flowchart showing the details of main subject determination processing (step S903).

FIG. 14 is a flowchart showing the details of the main subject determination processing (step S903). In step S1402, the CPU 121 determines whether there are reliability degrees higher than a predetermined threshold among one or more reliability degrees which have been obtained for one or more subjects in step S1006, and which indicate the likelihood of being a main subject. In a case where there are reliability degrees higher than the predetermined threshold, processing proceeds to step S1403; otherwise, processing proceeds to step S1404.

In step S1403, the CPU 121 determines a main subject from among the subjects with the reliability degrees higher than the predetermined threshold. For example, the CPU 121 determines, as a main subject, a subject with the highest reliability degree indicating the likelihood of being a main subject. Alternatively, the CPU 121 may determine a main subject from among the subjects with the reliability degrees higher than the predetermined threshold based on, for example, the positions and the sizes in the angle of view.

In step S1404, the CPU 121 determines whether there are subjects for which personal recognition has been performed in step S1004 (recognized subjects). In a case where there are recognized subjects, processing proceeds to step S1406; otherwise, processing proceeds to step S1407.

In step S1406, the CPU 121 determines a main subject from among the recognized subjects. For example, the CPU 121 determines, as a main subject, a recognized subject with the highest degree of similarity calculated in step S1103. Alternatively, the CPU 121 may determine a main subject from among the recognized subjects based on, for example, the positions and the sizes in the angle of view.

In step S1407, the CPU 121 determines a main subject identified through the tracking in step S1003 as a main subject in the current image data.

In step S1408, the CPU 121 determines whether the main subject determined in step S1403, S1406, or S1407 has changed from a main subject that was previously determined (in a case where the main subject has been determined in step S1407, it is determined that the main subject has not changed). In a case where it is determined that the main subject has changed, processing proceeds to step S1409; otherwise, processing proceeds to step S1410.

In step S1409, the CPU 121 sets 1 to a main subject change flag.

In step S1410, the CPU 121 sets 0 to the main subject change flag.

Once step S1409 or step S1410 has ended, the CPU 121 ends the subroutine of the main subject determination processing, and processing proceeds to step S904 of FIG. 9.

Storage Processing

Figure 15:
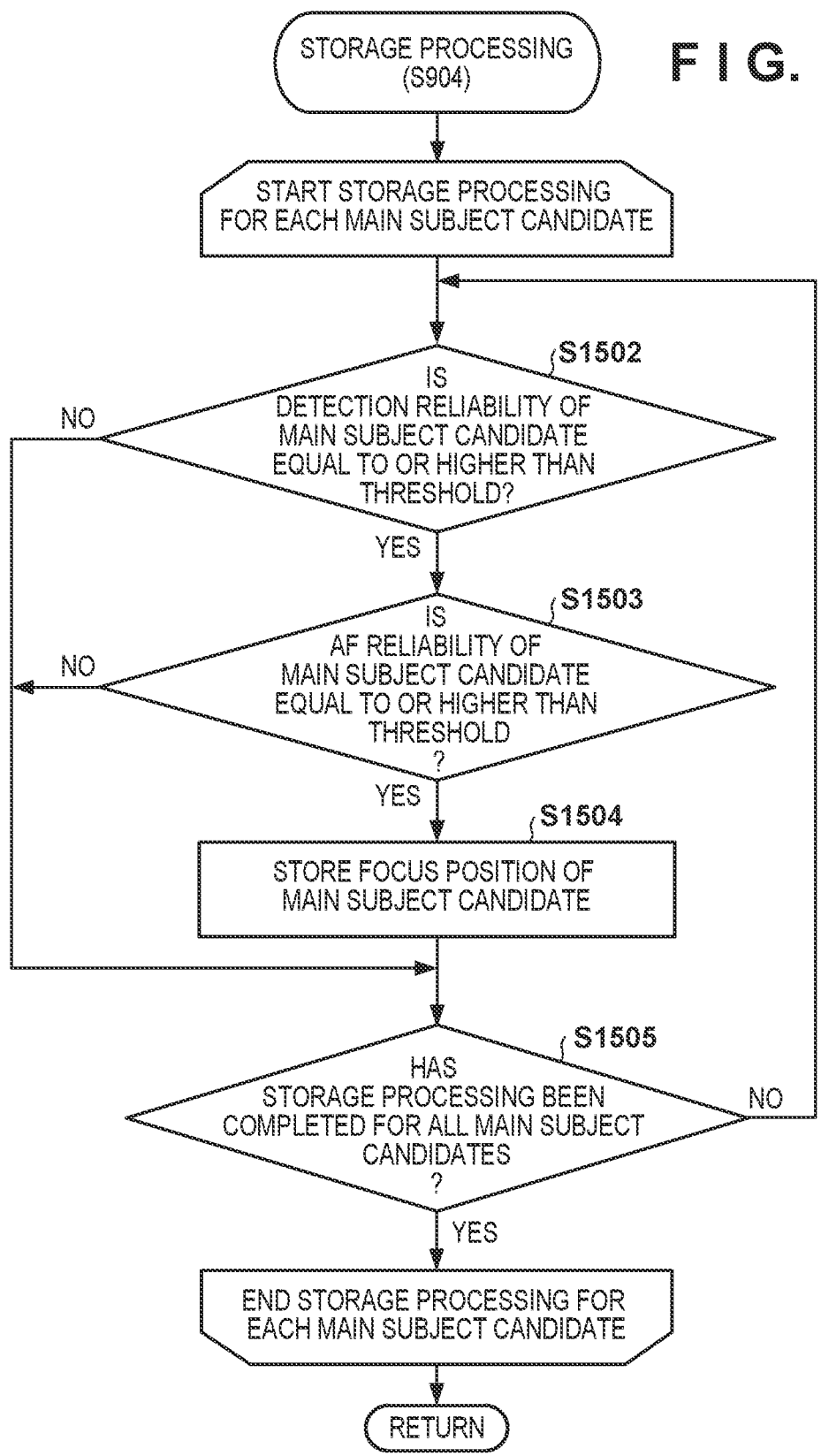
FIG. 15 is a flowchart showing the details of storage processing (step S904).

FIG. 15 is a flowchart showing the details of the storage processing (step S904). The storage processing is processing for, with respect to each of a plurality of main subject candidates, storing a focus position together with the time of detection of the focus position as a pair. The plurality of main subject candidates include, for example: recognized subjects that have been recognized in step S1104: subjects whose reliability degrees, which have been calculated in step S1006 and which indicate the likelihood of being a main subject, are equal to or higher than a predetermined threshold (i.e., subjects that are likely to be a main subject); and a main subject that has been tracked in tracking processing executed in step S1003. A focus position is defined based on a defocus amount and on the position of the third lens assembly 105 at the time of detection of the defocus amount.

In step S1502, the CPU 121 determines whether the detection reliability of the main subject candidate is equal to or higher than a predetermined threshold (second threshold). In the case of a recognized subject that has been recognized in step S1104, the degree of similarity calculated in step S1103 is used as the detection reliability (detection reliability degree) of the main subject candidate; in the case of a subject based on the reliability degree which has been calculated in step S1006 and which indicates the likelihood of being a main subject, the reliability degree (probability) indicating the likelihood of being a main subject is used thereas. In a case where the detection reliability degree of the main subject candidate is equal to or higher than the predetermined threshold, it is determined that the main subject candidate can be a main subject in the future, and therefore processing proceeds to step S1503. In a case where the detection reliability degree of the main subject candidate is lower than the predetermined threshold, processing proceeds to step S1505.

In step S1503, the CPU 121 determines whether the AF reliability of the main subject candidate is equal to or higher than a predetermined threshold (third threshold). In the camera 100, 9600 focus detection regions are set, and a defocus amount has been calculated at each of these regions. The CPU 121 selects a focus detection candidate in the vicinity of the position of the main subject candidate, and determines whether the AF reliability thereof is equal to or higher than the predetermined threshold. In a case where the AF reliability is equal to or higher than the predetermined threshold, processing proceeds to step S1504; otherwise, processing proceeds to step S1505. Note that in a case where the AF reliability of the focus detection candidate in the vicinity of the position of the main subject candidate is equal to or lower than the predetermined threshold, the CPU 121 may select a main subject candidate based on focus detection candidates in the neighborhood of the position of the main subject candidate.

In step S1504, the CPU 121 stores, into the RAM, a pair of the focus position obtained from the defocus amount detected in the focus detection regions corresponding to the main subject candidate, and the time of detection of the defocus amount. The focus position and the time of detection are stored in association with the main subject candidate. As a result, the chronological focus positions are stored in the RAM for each main subject candidate.

In step S1505, the CPU 121 determines whether the storage processing has been completed with respect to every main subject candidate. In a case where the storage processing has been completed with respect to every main subject candidate, the CPU 121 ends the subroutine of the storage processing, and processing proceeds to step S905 of FIG. 9. In a case where an unprocessed main subject candidate exists, the CPU 121 causes processing to return to step S1502.

As a result of storing the focus positions for each main subject candidate through the above-described storage processing, a future focus position can be predicted based on the prestored chronological focus positions when a main subject has changed.

Prediction Processing

Figure 16:
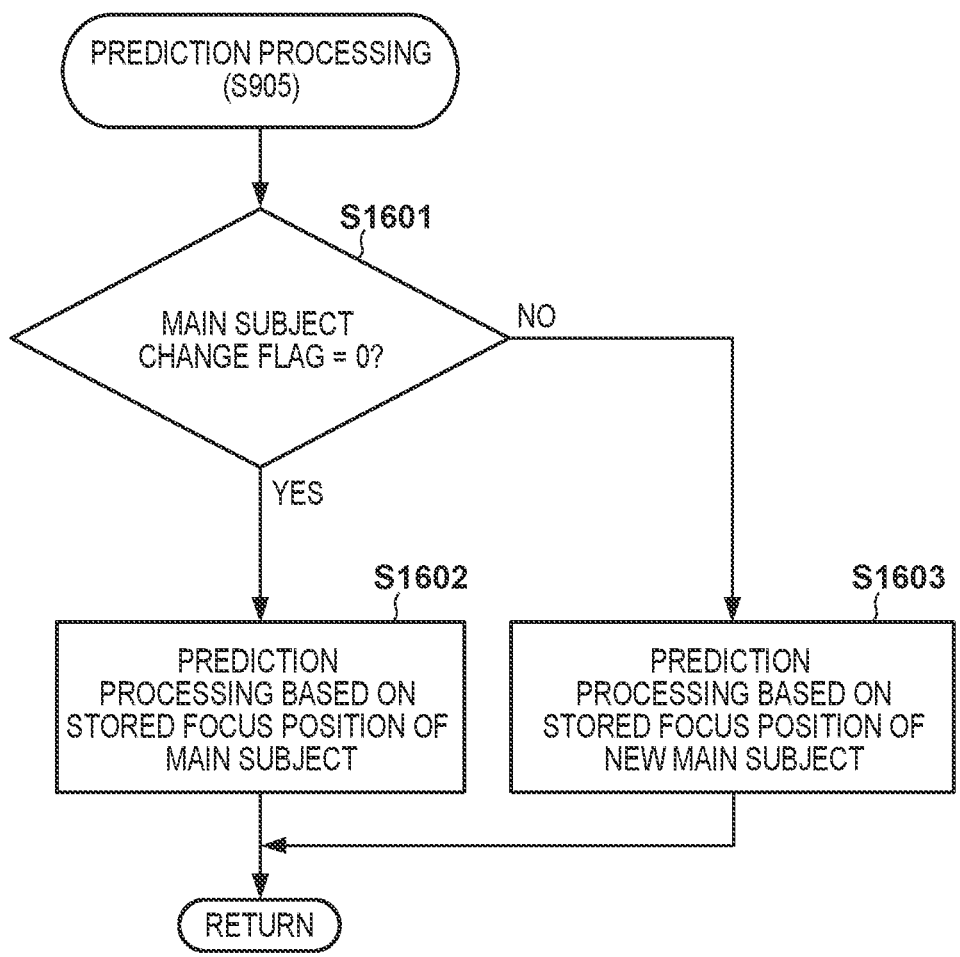
FIG. 16 is a flowchart showing the details of prediction processing (step S905).

FIG. 16 is a flowchart showing the details of the prediction processing (step S905). In step S1601, the CPU 121 determines whether the main subject change flag indicates 0. In a case where the main subject change flag indicates 0, processing proceeds to step S1602: otherwise (in a case where the main subject change flag indicates 1), processing proceeds to step S1603.

In step S1602, the CPU 121 obtains the chronological pieces of focus position data of the current main subject among the chronological pieces of focus position data that have been stored into the RAM for each main subject candidate in step S1504. The CPU 121 predicts a future focus position of the main subject based on the obtained chronological pieces of focus position data. A method of predicting a future focus position is not particularly limited; for example, the CPU 121 can predict a future focus position by obtaining a regression curve of the focus positions based on the method of least squares with use of the times of detection of defocus amounts and the detected focus positions.

In step S1603, the CPU 121 obtains the chronological pieces of focus position data of a new main subject, which has been determined in step S903, among the chronological pieces of focus position data that have been stored into the RAM for each main subject candidate in step S1504. The CPU 121 predicts a future focus position of the new main subject based on the obtained chronological pieces of focus position data. In this way, a future focus position can be predicted based on the pieces of focus position data of the new main subject that have been accumulated in the RAM before the change of the main subject. A method of predicting a future focus position is similar to that of step S1602.

Once processing of step S1602 or step S1603 has ended, the CPU 121 ends the subroutine of the prediction processing, and processing proceeds to step S906 of FIG. 9.

Note that the CPU 121 may execute the prediction processing with respect to the pieces of focus position data of every main subject candidate that have been stored in the RAM irrespective of the value of the main subject change flag, although this increases the amount of computation.

Lens Driving Processing

Figure 17:
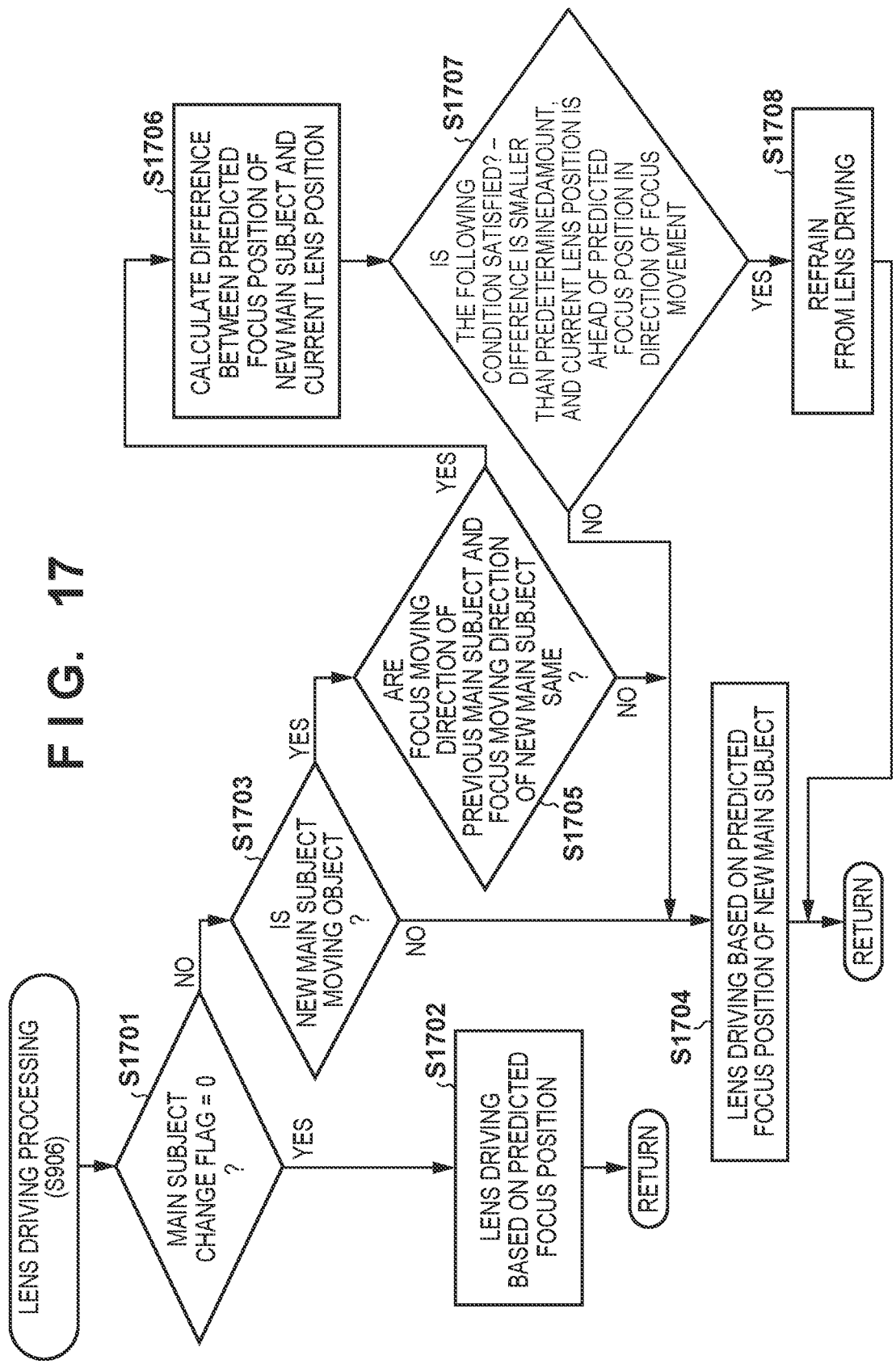
FIG. 17 is a flowchart showing the details of lens driving processing (step S906).

FIG. 17 is a flowchart showing the details of the lens driving processing (step S906). In step S1701, the CPU 121 determines whether the main subject change flag indicates 0. In a case where the main subject change flag indicates 0, processing proceeds to step S1702; otherwise (in a case where the main subject change flag indicates 1), processing proceeds to step S1703.

In step S1702, the CPU 121 drives the third lens assembly 105 via the focus actuator 114 by causing the focus driving circuit 126 to operate based on the future focus position of the current main subject calculated in step S1602.

In step S1703, the CPU 121 determines whether a new main subject is a moving object (a subject moving in the optical axis direction). A determination method is not particularly limited; for example, the CPU 121 may obtain a linear regression line with use of the method of least squares from the chronological pieces of focus position data of the main subject that have been stored in the RAM in step S1504, and determine that the main subject is a moving object in a case where the inclination of the linear regression line is equal to or larger than a predetermined threshold. In a case where the main subject has been determined to be a moving object, processing proceeds to step S1705: otherwise, processing proceeds to step S1704.

In step S1704, the CPU 121 drives the third lens assembly 105 via the focus actuator 114 by causing the focus driving circuit 126 to operate based on the future focus position of the new main subject calculated in step S1603.

In step S1705, the CPU 121 determines whether the focus moving direction of the previous main subject matches the focus moving direction of the new main subject. The focus moving direction mentioned here refers to the direction in which the focus position is moving toward the infinity side or toward the near side (the camera 100 side) in the optical axis direction. In a case where the focus moving direction of the previous main subject matches the focus moving direction of the new main subject, processing proceeds to step S1706; otherwise, processing proceeds to step S1704.

In step S1706, the CPU 121 calculates a difference between the future focus position of the new main subject calculated in step S1603 and the focus position of the third lens assembly 105. Here, with regard to the future focus position of the new main subject, the regression curve of the focus positions has been obtained in step S1603. Therefore, the time of the shooting operation performed in step S805, the time at which live-view images are shot next in step S801, or another time may be used as the time of the predicted future focus position.

In step S1707, the CPU 121 determines whether the following condition is satisfied: the difference between the focus positions calculated in step S1706 is smaller than a predetermined amount (first threshold), and also, the current focus position of the third lens assembly 105 is ahead of the future focus position of the new main subject calculated in step S1603 in the direction of focus movement. Here, "ahead in the direction of focus movement" means ahead in the direction of movement of the focus position attributed to previous lens driving (first focus control). When this condition is satisfied, it means that the current focus position of the third lens assembly 105 is ahead of the future focus position of the new main subject. Therefore, if the third lens assembly 105 is driven using the future focus position calculated in step S1603 as is, the driving direction of the third lens assembly 105 will be inverted. For this reason, in a case where this condition is satisfied, the CPU 121 causes processing to proceed to step S1708, and temporarily refrains from driving the third lens assembly 105. In this way, the focus tracking performance at the time of change of the main subject can be improved. On the other hand, in a case where this condition is not satisfied, the CPU 121 causes processing to proceed to step S1704, and drives the third lens assembly 105 based on the future focus position calculated in step S1603.

Due to the above-described lens driving processing, when a main subject has changed to a new main subject, the position of the focus lens can be appropriately moved in conformity with the focus position of the new main subject.

Summary of First Embodiment

As described above, according to the first embodiment, the camera 100 detects two or more subjects (step S902) in each of the images that are sequentially generated through continuous shooting (step S801). With respect to each image, the camera 100 selects a main subject from among the two or more subjects that have been detected (step S903). With respect to each image, the camera 100 stores a focus position at which a target subject is brought into focus, for each of the two or more subjects that have been detected as the target subject (step S904). In response to generation of a specific image (first image) through continuous shooting, the camera 100 predicts a future focus position of the main subject in the first image based on a history of focus positions corresponding to the main subject in the first image (the chronological focus positions corresponding to the main subject in the first image among the chronological focus positions of each main subject candidate stored in step S1504) (step S905).

As described above, according to the present embodiment, in a situation where a main subject is selected from among two or more subjects included in shot images, the camera 100 stores a history of focus positions of each subject. That is to say, with respect to each image, the focus position is recorded also for subjects other than the main subject. Therefore, in response to generation of a specific image, the camera 100 can predict a future focus position of a main subject in this image based on a history of focus positions corresponding to the main subject in this image, irrespective of whether the main subject in this image was a main subject in a previous image. Therefore, the accuracy of prediction of the future focus position of the main subject is improved. As the future focus position of the main subject is predicted with high accuracy, highly accurate control is realized by controlling the focus position of the optical system based on such a future focus position. Therefore, in a situation where a main subject is selected from among two or more subjects included in shot images, the present embodiment can improve the accuracy of focus position control based on the main subject.

Second Embodiment

In a second embodiment, a modification example of the storage processing according to the first embodiment (FIG. 15) will be described. In the second embodiment, the configuration of the camera 100 (FIG. 1), the predictive shooting processing (FIG. 8), the focus adjustment processing (FIG. 9), the subject detection processing (FIG. 10), the personal recognition processing (FIG. 11), the main subject determination processing (FIG. 14), the prediction processing (FIG. 16), and the lens driving processing (FIG. 17) are similar to those of the first embodiment. The following mainly describes the differences from the first embodiment.

Storage Processing

Figure 18:
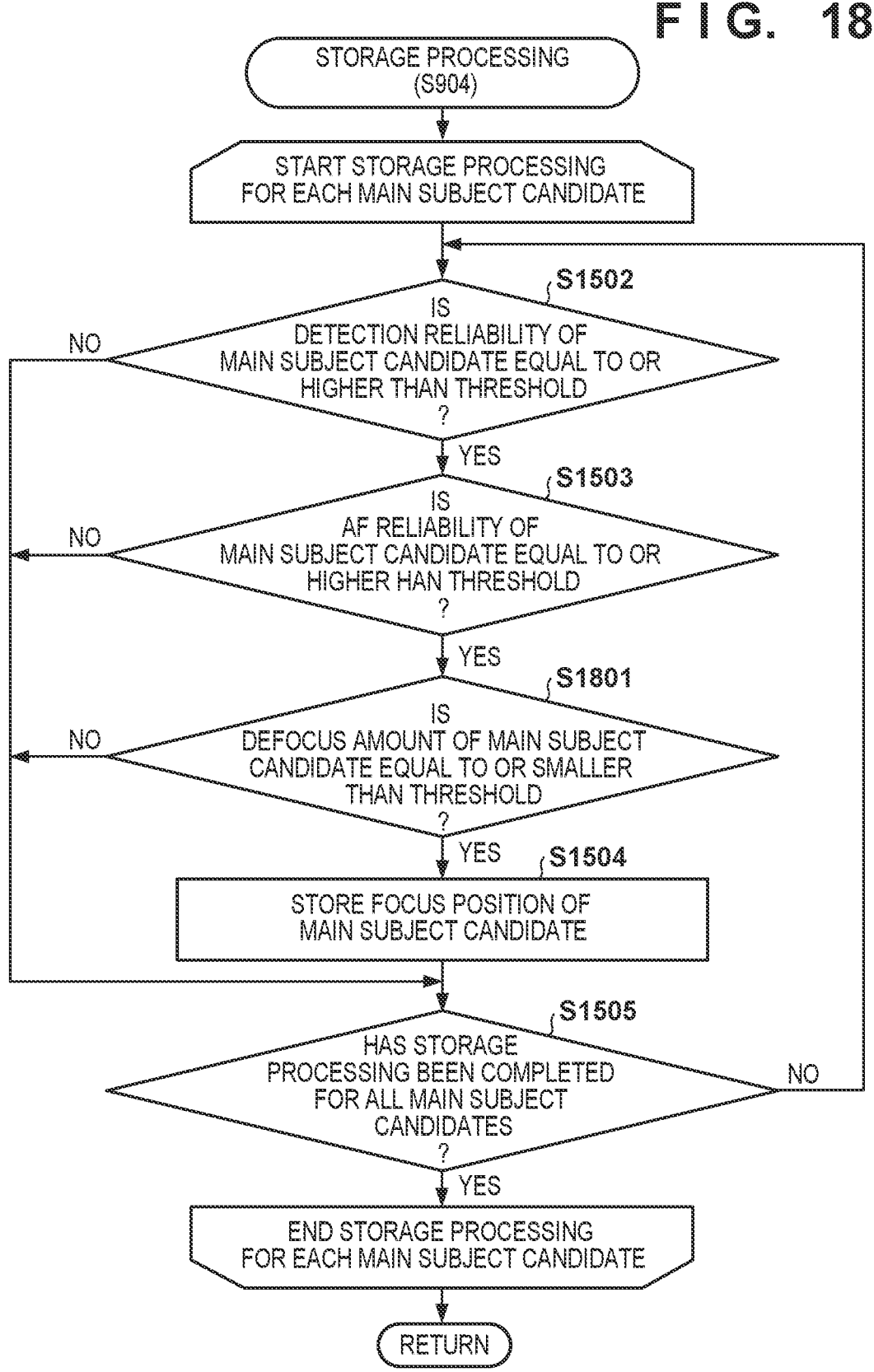
FIG. 18 is a flowchart showing the details of storage processing (step S904) according to a second embodiment.

FIG. 18 is a flowchart showing the details of storage processing (step S904) according to the second embodiment. In step S1801, the CPU 121 determines whether the defocus amount of the main subject candidate is equal to or smaller than a threshold (fourth threshold). In a case where the defocus amount of the main subject candidate is equal to or smaller than the threshold, processing proceeds to step S1504; otherwise, processing proceeds to step S1505.

Summary of Second Embodiment

When the defocus amount of the main subject candidate is large, there is a high possibility that this defocus amount itself has an error. Therefore, there is a high possibility that the focus position of the main subject candidate calculated based on the defocus amount, too, has an error. In the second embodiment, as the focus position of the main subject candidate is not stored in a case where the defocus amount of the main subject candidate is large, an error in the future focus position obtained in the prediction processing executed in step S904 of FIG. 9 can be alleviated.

Third Embodiment

In a third embodiment, modification examples of the subject detection processing (FIG. 10), the main subject determination processing (FIG. 14), and the storage processing (FIG. 15) according to the first embodiment will be described. In the third embodiment, the configuration of the camera 100 (FIG. 1), the predictive shooting processing (FIG. 8), the focus adjustment processing (FIG. 9), the prediction processing (FIG. 16), and the lens driving processing (FIG. 17) are similar to those of the first embodiment.

Subject Detection Processing and Storage Processing

Figure 19:
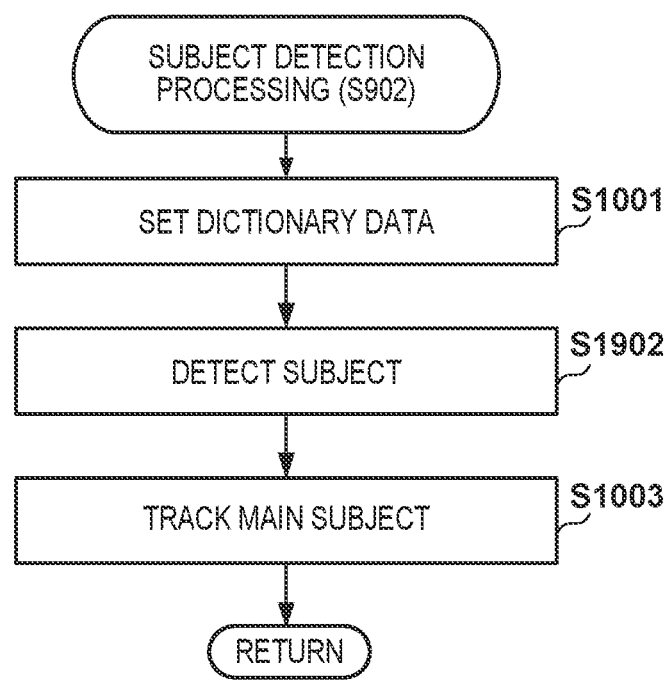
FIG. 19 is a flowchart showing the details of subject detection processing (step S902) according to a third embodiment.

FIG. 19 is a flowchart showing the details of subject detection processing (step S902) according to the third embodiment. In step S1902, the CPU 121 hierarchically detects a plurality of regions related to a person (a plurality of organs such as a "whole body", "face", and "eyes") in image data, similarly to step S1002. In addition, the CPU 121 adopts a detection reliability degree of an organ as a reliability degree indicating the likelihood of being a main subject, and considers the organ as a candidate that can be a main subject when the reliability degree indicating the likelihood of being a main subject has exceeded a predetermined threshold.

Furthermore, according to the third embodiment, for each of the organs detected in step S1902, the focus position in the vicinity of this detected organ and the time of detection of a defocus amount thereof are stored in the RAM in the storage processing (FIG. 15 or FIG. 18).

Main Subject Determination Processing

Figure 20:
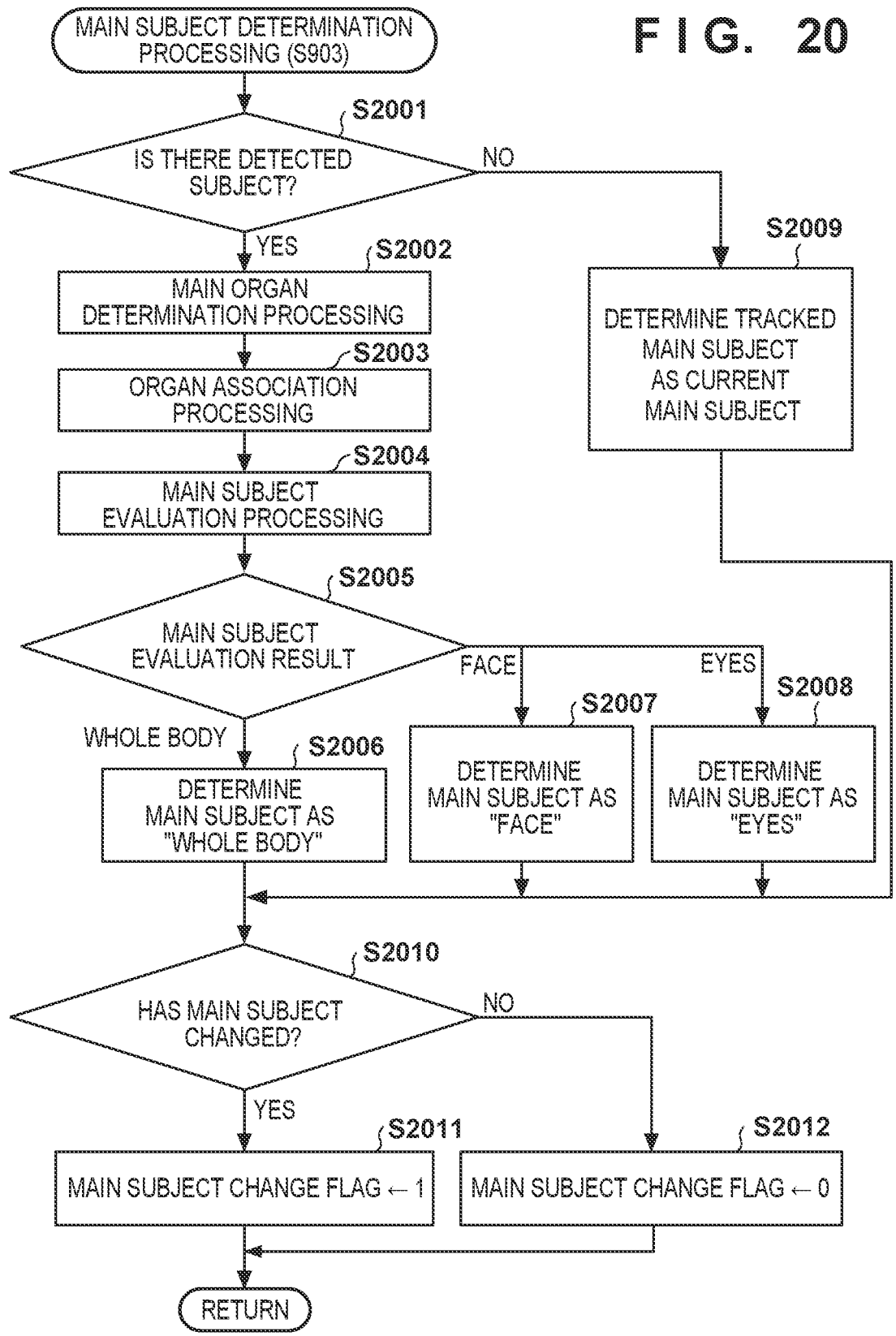
FIG. 20 is a flowchart showing the details of main subject determination processing (step S903) according to the third embodiment.

FIG. 20 is a flowchart showing the details of main subject determination processing (step S903) according to the third embodiment. In step S2001, the CPU 121 determines whether there is a detected subject. In a case where there is a subject that has been detected through the subject detection processing of FIG. 19, processing proceeds to step S2002: otherwise, processing proceeds to step S2008.

In step S2002, the CPU 121 executes main organ determination processing. This is because a plurality of organs of a subject may be detected in step S1902 of FIG. 19. For example, when "person" has been set as detection-purpose dictionary data, regions of the "whole body", "face", and "eyes" of a person can be detected in step S1902. The CPU 121 determines a main organ from among the plurality of detected organs. There are a variety of determination methods: for example, the CPU 121 can determine a detected organ that is closest to the center of the screen as the main organ. As another determination method, the CPU 121 may determine the main organ based on the sizes of detected organs, or may determine the main organ based on the combination of the position and the size of each organ. The CPU 121 determines, as a main subject, a subject including the organ that has been determined as the main organ.

In step S2003, the CPU 121 executes organ association processing. That is to say, with respect to the plurality of organs detected in step S1902 of FIG. 19, the CPU 121 executes processing for associating the organs of the same subject with one another. For example, the detected "whole body", and the "face" and "eyes" within a predetermined distance from this "whole body", are associated with one another as the same subject. When the organs of a plurality of persons have been detected, the association is made on a person-to-person basis.

In step S2004, the CPU 121 executes main subject evaluation processing. The main subject evaluation processing is processing for determining a main subject from among the main organ detected in step S2002 and the organs that have been associated with the main organ in step S2003. As stated earlier, in the storage processing (FIG. 15 or FIG. 18), the chronological focus positions have been stored in the RAM for each detected organ. Therefore, in this main subject evaluation processing, the CPU 121 evaluates which organ is to be selected as a main subject based on the chronological stability of organ detection, that is to say, whether each organ has been detected or has not been detected. Alternatively, the CPU 121 may select an organ with a small variation in the per-organ chronological focus positions stored in the RAM as the main subject.

This main subject evaluation processing enables selection of an organ for which stable organ detection and focus detection have been successfully performed from among the plurality of organs of the subject including the main organ, thereby enhancing the focus stability. For example, in a scene where the shooting distance is long and the "whole body" has been successfully detected on a continuous basis as the main organ but the "face" and "eyes" can be detected only temporarily, the main subject is evaluated to be the "whole body". On the other hand, in a scene where the shooting distance is short and the main organ is the "whole body" but the "face" associated therewith has been successfully detected in the most stable manner, the main subject is evaluated to be the "face".

In step S2005, the CPU 121 causes branching in accordance with the result of the main subject evaluation processing of step S2004. Processing proceeds to step S2006 when the main subject has been evaluated to be the "whole body", processing proceeds to step S2007 when the main subject has been evaluated to be the "face", and processing proceeds to step S2008 when the main subject has been evaluated to be the "eyes".

In step S2009, the CPU 121 determines a main subject identified through the tracking in step S1003 (FIG. 19) as a main subject in the current image data.

In step S2010, the CPU 121 determines whether the main subject has changed. When there are a plurality of persons in processing from step S2001 to step S2009, the main subject may change among the persons; even when there is only one person, the main subject may change among organs if a plurality of organs have been detected. The CPU 121 determines whether the main subject that has been determined in one of steps S2006 to S2009 has changed from the main subject that was previously determined (in a case where the main subject has been determined in step S2009, it is determined that the main subject has not changed). In a case where it is determined that the main subject has changed, processing proceeds to step S2011: otherwise, processing proceeds to step S2012.

In step S2011, the CPU 121 sets 1 to the main subject change flag.

In step S2012, the CPU 121 sets 0 to the main subject change flag.

Summary of Third Embodiment

According to the third embodiment, when a subject includes a plurality of organs and a main subject has changed thereamong, the above-described configuration can bring the post-change main subject into focus in conformity with the intention of the photographer.

Fourth Embodiment

In a fourth embodiment, a modification example of the lens driving processing according to the first embodiment (FIG. 16) will be described. In the fourth embodiment, the configuration of the camera 100 (FIG. 1), the predictive shooting processing (FIG. 8), the focus adjustment processing (FIG. 9), the subject detection processing (FIG. 10), the personal recognition processing (FIG. 11), the main subject determination processing (FIG. 14), the storage processing (FIG. 15), and the prediction processing (FIG. 16) are similar to those of the first embodiment. Furthermore, with regard to processing for which the modification examples have been described in the second embodiment and the third embodiment, processing according to the modification examples may be adopted in place of the configurations of the first embodiment. The following mainly describes the differences from the first embodiment.

Lens Driving Processing

Figure 21:
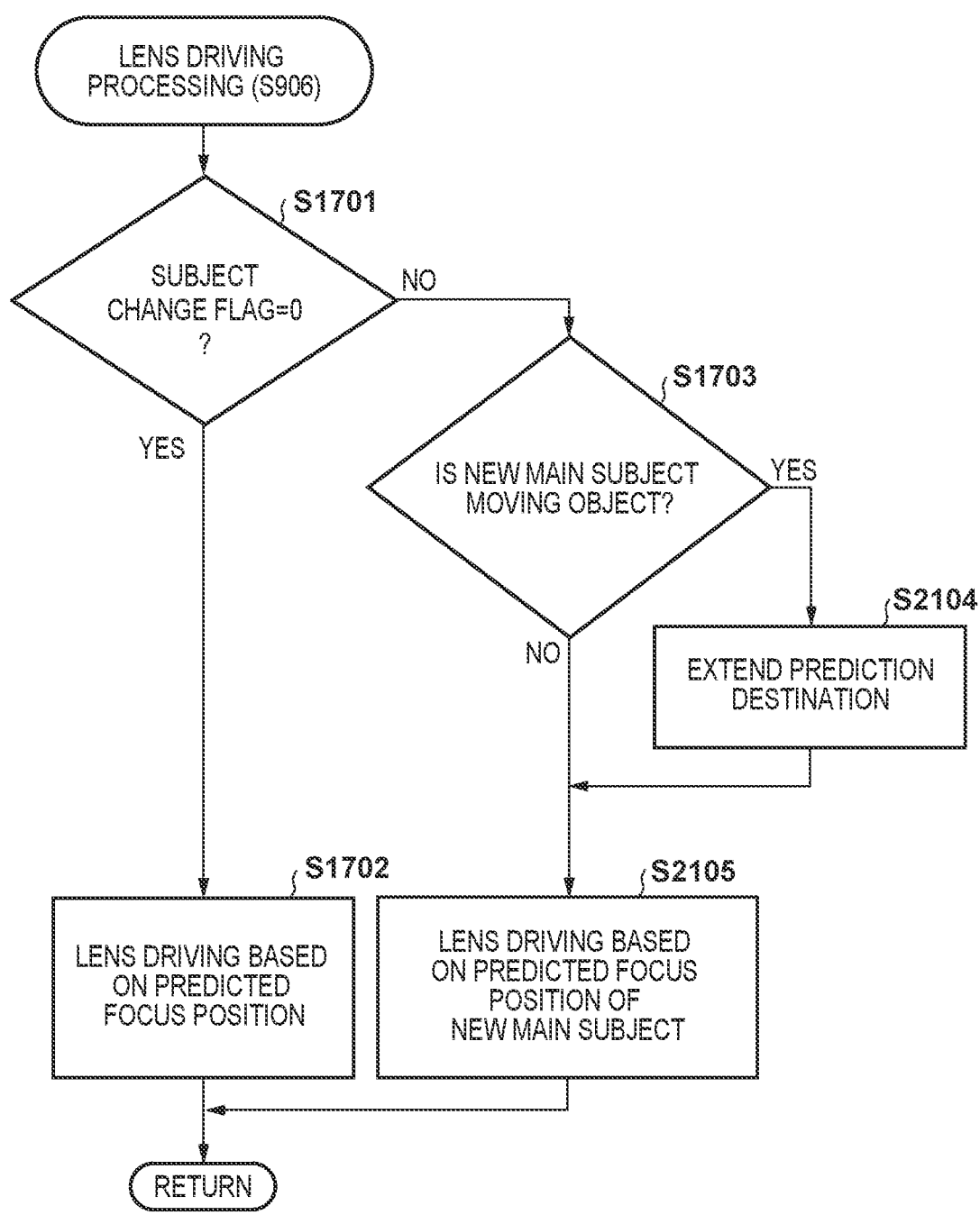
FIG. 21 is a flowchart showing the details of lens driving processing (step S906) according to a fourth embodiment.

FIG. 21 is a flowchart showing the details of lens driving processing (step S906) according to the fourth embodiment. In the present embodiment, in a case where the new main subject has been determined to be a moving object in step S1703, processing proceeds to step S2104; otherwise, processing proceeds to step S2105.

In step S2104, the CPU 121 extends a prediction destination. This is processing in which, as the main subject has changed, the time of prediction of a future focus position of the new main subject is set to time in a more distant future. In other words, in a case where the new main subject is not a moving object, the prediction destination is a first time, whereas in a case where the new main subject is a moving object, the prediction destination is a second time that is after the first time. For example, during continuous shooting, the CPU 121 extends the prediction destination so that the focus position of the new main subject can be predicted not for the time of shooting processing for the immediately succeeding frame executed in step S805, but for the time of shooting processing for the even next frame.

As a result, the focus lens can be moved, without being inverted, when the focus moving direction of the previous main subject matches the focus moving direction of the new main subject, and also the focus position of the new main subject is moving with a slight delay compared to the focus position of the previous main subject. Furthermore, in a case where the focus moving direction of the previous main subject and the focus moving direction of the new main subject are opposite to each other, the focus lens can be moved stably by predicting time in a more distant future.

In step S2105, the CPU 121 drives the third lens assembly 105 via the focus actuator 114 by causing the focus driving circuit 126 to operate based on the future focus position of the new main subject. The "future focus position of the new main subject" mentioned here denotes the focus position calculated in step S1603 in a case where processing has transitioned from step S1703 to step S2105, and the predicted focus position at the prediction destination that has been extended in step S2104 in a case where processing has transitioned from step S2104 to step S2105.

Summary of Fourth Embodiment

According to the fourth embodiment, when a main subject has changed to a new main subject, the above-described configuration can move the position of the focus lens appropriately in conformity with the focus position of the new main subject.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-004702, filed Jan. 16, 2023, which is hereby incorporated by reference herein in its entirety.

What is claimed is:

1. A focus prediction apparatus comprising at least one processor and/or at least one circuit which functions as:
   a detection unit configured to detect two or more subjects in each of a plurality of images that are sequentially generated through continuous shooting;
   a selection unit configure to select a main subject from among the two or more subjects with respect to each of the images;
   a storage unit configured to, with respect to each of the images, store a focus position at which a target subject is brought into focus, for each of the two or more subjects as the target subject; and
   a prediction unit configured to perform first prediction processing in response to generation of a first image through the continuous shooting, the first prediction processing being for predicting a future focus position of a main subject in the first image based on a history of focus positions corresponding to the main subject in the first image,
   wherein
   in a case where a detection reliability for a specific subject included among the two or more subjects in a specific image generated through the continuous shooting is smaller than a second threshold, the storage unit refrains from storing a focus position corresponding to the specific subject with respect to the specific image.

2. The focus prediction apparatus according to claim 1, wherein the at least one processor and/or the at least one circuit further functions as
   a control unit configured to perform first focus control in response to the generation of the first image through the continuous shooting, the first focus control being for controlling a focus position of an optical system used in the continuous shooting based on the future focus position of the main subject in the first image.

3. The focus prediction apparatus according to claim 2, wherein
   in response to generation of a second image through the continuous shooting after the first image has been generated:
      the prediction unit executes second prediction processing for predicting a future focus position of a main subject in the second image based on a history of focus positions corresponding to the main subject in the second image; and
      the control unit performs second focus control for controlling the focus position of the optical system used in the continuous shooting based on the future focus position of the main subject in the second image.

4. The focus prediction apparatus according to claim 3, wherein
the control unit refrains from executing the second focus control in a case where the main subject in the second image is different from the main subject in the first image, a moving direction of the main subject in the first image matches a moving direction of the main subject in the second image in an optical axis direction of the optical system, a difference between the future focus position of the main subject in the second image and a current focus position of the optical system is smaller than a first threshold, and the current focus position of the optical system is ahead of the future focus position of the main subject in the second image in a direction of movement of the focus position of the optical system through the first focus control.

5. The focus prediction apparatus according to claim 3, wherein
in a case where the main subject in the second image is different from the main subject in the first image:
if the main subject in the second image is not moving in an optical axis direction of the optical system, the prediction unit predicts a focus position at a first time as the future focus position of the main subject in the second image; and
if the main subject in the second image is moving in the optical axis direction of the optical system, the prediction unit predicts a focus position at a second time as the future focus position of the main subject in the second image, the second time being after the first time.

6. The focus prediction apparatus according to claim 1, wherein
in a case where an AF reliability for a specific subject included among the two or more subjects in a specific image generated through the continuous shooting is smaller than a third threshold, the storage unit refrains from storing a focus position corresponding to the specific subject with respect to the specific image.

7. The focus prediction apparatus according to claim 1, wherein
in a case where a defocus amount for a specific subject included among the two or more subjects in a specific image generated through the continuous shooting is larger than a fourth threshold, the storage unit refrains from storing a focus position corresponding to the specific subject with respect to the specific image.

8. An image capturing apparatus, comprising:
the focus prediction apparatus according to claim 1,
wherein the at least one processor and/or the at least one circuit further functions as a shooting unit configured to sequentially generate the images by performing the continuous shooting.

9. A focus prediction method executed by a focus prediction apparatus, comprising:
detecting two or more subjects in each of a plurality of images that are sequentially generated through continuous shooting;
selecting a main subject from among the two or more subjects with respect to each of the images;
with respect to each of the images, storing a focus position at which a target subject is brought into focus, for each of the two or more subjects as the target subject; and
performing first prediction processing in response to generation of a first image through the continuous shooting, the first prediction processing being for predicting a future focus position of a main subject in the first image based on a history of focus positions corresponding to the main subject in the first image,
wherein
in a case where a detection reliability for a specific subject included among the two or more subjects in a specific image generated through the continuous shooting is smaller than a second threshold, refraining from storing a focus position corresponding to the specific subject with respect to the specific image.

10. A non-transitory computer-readable storage medium which stores a program for causing a computer to execute a focus prediction method comprising:
detecting two or more subjects in each of a plurality of images that are sequentially generated through continuous shooting;
selecting a main subject from among the two or more subjects with respect to each of the images;
with respect to each of the images, storing a focus position at which a target subject is brought into focus, for each of the two or more subjects as the target subject; and
performing first prediction processing in response to generation of a first image through the continuous shooting, the first prediction processing being for predicting a future focus position of a main subject in the first image based on a history of focus positions corresponding to the main subject in the first image,
wherein
in a case where a detection reliability for a specific subject included among the two or more subjects in a specific image generated through the continuous shooting is smaller than a second threshold, refraining from storing a focus position corresponding to the specific subject with respect to the specific image.

* * * * *